(12) United States Patent
Choi et al.

(10) Patent No.: US 12,176,505 B2
(45) Date of Patent: Dec. 24, 2024

(54) BATTERY MODULE AND MANUFACTURING METHOD THEREOF

(71) Applicant: SK INNOVATION CO., LTD., Seoul (KR)

(72) Inventors: Yang Kyu Choi, Daejeon (KR); Sol San Son, Daejeon (KR); Dong Hun Lim, Daejeon (KR); Seung Hoon Ju, Daejeon (KR)

(73) Assignee: SK ON CO., LTD., Seoul (KR)

( * ) Notice: Subject to any disclaimer, the term of this patent is extended or adjusted under 35 U.S.C. 154(b) by 262 days.

(21) Appl. No.: 16/232,823

(22) Filed: Dec. 26, 2018

(65) Prior Publication Data

US 2019/0198952 A1 Jun. 27, 2019

(30) Foreign Application Priority Data

Dec. 26, 2017 (KR) .................. 10-2017-0179708
Dec. 21, 2018 (KR) .................. 10-2018-0167005

(51) Int. Cl.
*H01M 10/00* (2006.01)
*H01M 10/48* (2006.01)
(Continued)

(52) U.S. Cl.
CPC ....... *H01M 10/6554* (2015.04); *H01M 10/48* (2013.01); *H01M 10/613* (2015.04);
(Continued)

(58) Field of Classification Search
CPC ............. H01M 10/6554; H01M 2/266; H01M 10/613; H01M 2/1061; H01M 2/206;
(Continued)

(56) References Cited

U.S. PATENT DOCUMENTS 8,080,333 B2 * 12/2011 Akatsuchi ........... H01M 50/528
429/178
8,501,343 B2 * 8/2013 You .................... H01M 10/0525
429/163
(Continued)

FOREIGN PATENT DOCUMENTS

JP       2015111493 A  *  6/2015  .......... H01M 10/613
KR    20120048802 A  *  2/2012
(Continued)

OTHER PUBLICATIONS

Machine translation of KR20140085890A (Year: 2014).*
(Continued)

*Primary Examiner* — Nicholas P D'Aniello
(74) *Attorney, Agent, or Firm* — IP & T GROUP LLP

(57) ABSTRACT

The present invention provides a battery module, which includes: a battery group formed by stacking a plurality of battery cells, each of which includes electrode tabs; a cooling housing including a cooling plate located corresponding to one side of sides of the battery group, in which the electrode tabs are not extended, and side plates located on both sides of the battery group perpendicular to the one side of the sides, thus to house the battery group; a cover plate located on the other side of the battery group; and a front cover part and a rear cover part, which are located at outermost front and rear of the battery group on both sides in a direction in which the electrode tabs are extended.

17 Claims, 23 Drawing Sheets

(51) Int. Cl.
  *H01M 10/613* (2014.01)
  *H01M 10/655* (2014.01)
  *H01M 10/6551* (2014.01)
  *H01M 10/6554* (2014.01)
  *H01M 50/211* (2021.01)
  *H01M 50/271* (2021.01)
  *H01M 50/291* (2021.01)
  *H01M 50/507* (2021.01)
  *H01M 50/569* (2021.01)

(52) U.S. Cl.
  CPC ..... *H01M 10/655* (2015.04); *H01M 10/6551* (2015.04); *H01M 50/211* (2021.01); *H01M 50/271* (2021.01); *H01M 50/291* (2021.01); *H01M 50/507* (2021.01); *H01M 50/569* (2021.01)

(58) Field of Classification Search
  CPC ...... H01M 2/204; H01M 2/1077; H01M 2/26; H01M 10/655; H01M 10/6551; H01M 10/637; H01M 10/48; H01M 50/209; H01M 50/211; H01M 50/271; H01M 50/291; H01M 50/507; H01M 50/569; Y02E 60/10
  See application file for complete search history.

(56) References Cited

U.S. PATENT DOCUMENTS

| | | | | |
|---|---|---|---|---|
| 8,691,409 B2* | 4/2014 | Shin | ............... | H01M 50/502 |
| | | | | 429/61 |
| 10,892,448 B2* | 1/2021 | Jung | ............... | H01M 50/543 |
| 11,374,282 B2* | 6/2022 | Lee | ............... | H01M 50/262 |
| 2009/0305117 A1* | 12/2009 | Koh | ............... | H01M 10/425 |
| | | | | 429/61 |
| 2013/0230767 A1* | 9/2013 | Pak | ............... | H01M 2/0207 |
| | | | | 429/179 |
| 2015/0147638 A1* | 5/2015 | Tamura | ............ | H01M 10/0585 |
| | | | | 429/185 |
| 2015/0380779 A1* | 12/2015 | Kong | ............... | H01M 50/20 |
| | | | | 324/426 |
| 2016/0126523 A1* | 5/2016 | Arena | .............. | H01M 10/613 |
| | | | | 429/90 |
| 2016/0126531 A1* | 5/2016 | Kim | ............... | H01M 10/425 |
| | | | | 429/7 |
| 2016/0156011 A1* | 6/2016 | Frohnmayer | ....... | H01M 50/503 |
| | | | | 429/158 |
| 2017/0069887 A1† | 3/2017 | Lee | | |
| 2017/0190264 A1* | 7/2017 | Kim | ............... | H01M 50/242 |
| 2018/0062126 A1* | 3/2018 | Qin | ............... | A44C 15/005 |
| 2018/0138483 A1* | 5/2018 | Sekine | ............... | H01M 10/48 |
| 2018/0138565 A1* | 5/2018 | Lee | ............... | H01M 10/613 |
| 2018/0175346 A1* | 6/2018 | Schmid-Schoenbein ............... H01M 10/6554 | | |
| 2018/0183119 A1* | 6/2018 | Ju | ............... | H01M 10/613 |
| 2019/0389318 A1* | 12/2019 | Lee | ............... | H01M 50/516 |
| 2020/0058918 A1* | 2/2020 | Shin | ............... | H01M 10/625 |
| 2020/0067040 A1* | 2/2020 | Kim | ............... | H01M 10/6554 |
| 2020/0259155 A1* | 8/2020 | Lee | ............... | H01M 50/528 |
| 2021/0313664 A1* | 10/2021 | Park | ............... | H01M 50/507 |

FOREIGN PATENT DOCUMENTS

| | | | | |
|---|---|---|---|---|
| KR | 10-2013-0011740 | | 1/2013 | |
| KR | 10-1255250 | | 4/2013 | |
| KR | 10-2014-0040327 | | 4/2014 | |
| KR | 20140085890 A | * | 7/2014 | |
| KR | 101560217 | | 10/2015 | |
| KR | 10-2015-0142338 | | 12/2015 | |
| KR | 10-2016-0133776 | | 11/2016 | |
| KR | 10-2017-0022371 | | 3/2017 | |
| KR | 10-2017-0030667 | | 3/2017 | |
| KR | 10-2017-0036639 | | 4/2017 | |
| KR | 20170036639 A | † | 4/2017 | |
| KR | 10-2017-0078013 | | 7/2017 | |
| WO | 2013/073046 | | 5/2013 | |
| WO | WO-2014107094 A1 | * | 7/2014 | .......... H01M 10/482 |
| WO | 2017/052296 A1 | | 3/2017 | |
| WO | WO-2018124751 A1 | * | 7/2018 | .............. B60L 50/64 |
| WO | WO-2021096023 A1 | * | 5/2021 | ............ H01M 10/48 |
| WO | WO-2021145626 A1 | * | 7/2021 | |
| WO | WO-2021215625 A1 | * | 10/2021 | |
| WO | WO-2021256661 A1 | * | 12/2021 | |

OTHER PUBLICATIONS

Notice of Allowance issued by the KIPO on Mar. 23, 2020.
Office Action issued by the Korean Intellectual Property Office on Aug. 19, 2019.
Office Action for German Patent Application No. 102018133391.9 issued by the German Patent Office on Oct. 17, 2024.

\* cited by examiner
† cited by third party

Section A · Section B

BATTERY MODULE AND MANUFACTURING METHOD THEREOF

The present application claims priority of Korean patent application number 10-2017-0179708 filed on Dec. 26, 2017 and Korean patent application number 10-2018-0167005 filed on Dec. 21, 2018, which is incorporated herein by reference in its entirety.

BACKGROUND OF THE INVENTION

1. Field of the Invention

Embodiments of the present invention relate to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries are connected in series with each other to thereby be used for a high output hybrid automobile. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

Meanwhile, a conventional battery module further requires a separate fixing member for stacking and fixing a plurality of battery cells, and separate cooling members such as cooling tins and a cooling plate for cooling the battery cells, therefore, a volume of the battery module is increased. Furthermore, since respective sides of the battery module case are separately prepared as a separate component, and then are coupled with each other, a process of manufacturing the battery module is complicated, as well as time and costs are increased.

For example, Korean Patent Registration No. 10-1560217 discloses a battery module with improved cooling efficiency, which includes cooling members mounted on at least one surface of a stack of battery cells, and an electric insulation thermal conductive member provided between the stack of battery cells and the cooling member, however, it did not solve the above-described problems.

SUMMARY OF THE INVENTION

It is an object of embodiments of the present invention to provide a battery module capable of maximizing a volume thereof by largely increasing space utilization and maximizing energy density, and a manufacturing method thereof.

In addition, another object of embodiments of the present invention is to provide a battery module in which strength and rigidity thereof are reinforced to improve assemblability, and a manufacturing method thereof.

Further, another object of embodiments of the present invention is to provide a battery module in which one side of a cooling housing is opened to easily apply a fixing/heat transfer resin and insert a battery group during manufacturing, and a manufacturing method thereof.

Further, another object of embodiments of the present invention is to provide a battery module capable of minimizing an application amount of a fixing/heat transfer resin, and a manufacturing method thereof.

Further, another object of embodiments of the present invention is to provide a battery module in which a surface contact between a battery group and a cooling housing is maximized by an elastic pad provided on an upper side of the battery group, and a manufacturing method thereof.

Further, another object of embodiments of the present invention is to provide a battery module in which a fixing/heat transfer resin is thinly spread between a battery group and a cooling housing to increase a contact area therebetween, and thus maximize heat transfer efficiency of the battery group and the cooling housing, and a manufacturing method thereof.

Further, another object of embodiments of the present invention is to provide a battery module which includes an adhesion part in which a battery cell is not sealed, such that cooling efficiency of the battery module is enhanced through adhesion between the adhesion part and a cooling plate, and a manufacturing method thereof.

Further, another object of embodiments of the present invention is to provide a battery module in which a cooling plate includes protrusions having a shape corresponding to adhesion parts of battery cells, such that contact areas between the cooling plate and the battery cells are increased, and a manufacturing method thereof.

Further, another object of embodiments of the present invention is to provide a battery module capable of preventing a problem in which battery cells and a cooling plate do not come into surface contact with each other due to a tolerance in a width between the battery cells in a stacking direction thereof and a manufacturing method thereof.

Further, another object of embodiments of the present invention is to provide a battery module capable of easily placing and assembling bus bar assemblies, and a manufacturing method thereof.

Further, another object of embodiments of the present invention is to provide a battery module in which extension parts protruding outward from the battery cell are received in recesses formed in a cooling plate, such that a plurality of battery cells may be maintained in a state of being stacked with each other, and a method for producing the same.

Further, another object of embodiments of the present invention is to provide a battery module in which a cooling plate may include accommodating grooves to increase workability during manufacturing compared to the recesses, and a manufacturing method thereof.

Further, another object of embodiments of the present invention is to provide a battery module that may prevent a laser beam from penetrating battery cells in a process of coupling a cooling housing with front and rear cover parts or a cover plate, and a manufacturing method thereof.

Furthermore, another object of embodiments of the present invention is to provide a battery module in Which a cooling housing is formed as a single piece through an extrusion process, such that a manufacturing time and costs may be greatly reduced, and a manufacturing method thereof.

To accomplish the above objects, according to an aspect of the present invention, there is provided a battery module including: a battery group formed by stacking a plurality of battery cells, each of which includes electrode tabs; a cooling housing including a cooling plate located corresponding to one side of sides of the battery group, in which the electrode tabs are not extended, and side plates located on both sides of the battery group perpendicular to the one side of the sides, thus to house the battery group; a cover plate located on the other side of the battery group; and a front cover part and a rear cover part, which are located at outermost front and rear of the battery group on both sides in a direction in which the electrode tabs are extended.

The battery module may further include a heat transfer member, wherein the heat transfer member is located in a thin film form between the cooling plate and the battery group.

The heat transfer member is filled in an empty space between the cooling plate and the plurality of battery cells.

Each of the plurality of battery cells may include a sealing part and an adhesion part, which are formed at outer peripheries thereof by a sheath, wherein the sealing part is formed on three sides among four sides of circumferences of the battery cell, and the adhesion part is formed on the other side of the battery cell, and the cooling plate closely comes into contact with the adhesion part of the plurality of stacked battery cells through the heat transfer member.

The cooling plate may have a plurality of protrusions formed thereon, and each of the protrusions is disposed across the adhesion parts of adjacent battery cells.

Each of the protrusions may have a curved surface corresponding to a shape of a portion of the adhesion part.

A portion of the sealing part adjacent to the adhesion part may have an extension part extending in a direction perpendicular to the adhesion part.

The cooling plate may have a plurality of recesses formed therein to receive the extension part.

The plurality of recesses may be formed in the cooling plate at positions corresponding to the extension parts.

The cooling plate may have a plurality of accommodating grooves formed therein to receive the extension parts of one or more battery cells adjacent to each other of the plurality of stacked battery cells, respectively.

The cooling housing may be formed in as a single piece.

The electrode tabs may be extended from both sides of the battery group, and the battery module may further include: bus bar assemblies which are connected to the electrode tabs on both sides thereof, respectively, to electrically connect the plurality of battery cells to each other, and a sensing module assembly which is located on the other side of the battery group.

The battery module may further include: a sensing board located at one side of the bus bar assemblies on both sides thereof to detect a voltage of the plurality of battery cells, wherein the sensing module assembly electrically connects the remaining one of the bus bar assemblies to the sensing board.

The sensing module assembly may further include an elastic pad to press the battery group toward the cooling plate.

The battery group may include elastic members disposed between at least two bundles of the plurality of battery cells.

According to another aspect of the present invention, there is provided a method of manufacturing a battery module, including: stacking a plurality of battery cells, each of which includes electrode tabs; mounting the stacked plurality of battery cells in a cooling housing including a cooling plate located corresponding to one side of sides of the plurality of battery cells in which the electrode tabs are not extended, disposing a front cover part and a rear cover part at outermost both sides of the plurality of battery cells, in which the electrode tabs are extended; and disposing a cover plate on the other side of the plurality of battery cells.

The plurality of battery cells may be placed after a heat transfer member is applied to the cooling plate.

When the plurality artery cells are placed on the cooling plate, the heat transfer member may be thinly spread.

The method may further include: when the plurality of battery cells are placed, connecting bus bar assemblies to the electrode tabs to electrically connect the plurality of battery cells with each other.

The bus bar assemblies may be connected to both sides of the battery group, in which the electrode tabs are extended, and after connecting the bus bar assemblies, a sensing board to detect a voltage of the plurality of battery cells may be connected to one of the bus bar assemblies on both sides thereof.

The method may further include: after connecting the sensing board, placing a sensing module assembly, which electrically connects the remaining one of the bus bar assemblies on both sides thereof and the sensing board, on the other side of the plurality of battery cells.

The method may further include: after the sensing module assembly is placed, disposing the front cover part, the rear cover part and the cover plate; and coupling the front and rear cover parts and the cover plate with the cooling housing.

According to embodiments of the present invention, a volume of the battery module may be maximized by largely increasing space utilization and energy density may be maximized.

In addition, according to the embodiments of the present invention, strength and rigidity of the battery module may be reinforced, and assemblability may be improved.

Further, according to the embodiments of the present invention, one side of the cooling housing is opened, such that it is easy to apply a fixing/heat transfer resin and insert the battery group during manufacturing.

Further, according to the embodiments of the present invention, an application amount of the fixing/heat transfer resin may be minimized.

Further, according to the embodiments of the present invention, a surface contact between the battery group and the cooling housing may be maximized by the elastic pad provided on an upper side of the battery group.

Further, according to the embodiments of the present invention, the fixing/heat transfer resin is thinly spread between the battery group and the cooling housing to increase a contact area therebetween, and thus maximize heat transfer efficiency of the battery group and the cooling housing.

Further, according to embodiments of the present invention, battery module includes the adhesion part in which the battery cell is not sealed, such that cooling efficiency of the battery module may be enhanced through adhesion between the adhesion part and the cooling plate.

Further, according to embodiments of the present invention, the cooling plate includes the protrusions having a shape corresponding to the adhesion parts of the battery cell, such that a contact area between the cooling plate and the battery cell may be increased, and cooling efficiency of the battery module may be enhanced.

Further, according to the embodiments of the present invention, it is possible to prevent a problem in which the battery cells and the cooling plate are not come into surface contact with each other due to a tolerance in a width between the battery cells in a stacking direction thereof.

Further, according to the embodiments of the present invention, the bus bar assemblies may be easily placed and assembled.

Further, according to the embodiments of the present invention, the extension parts protruding outward from the battery cell are received in the recesses formed in the cooling plate, such that a plurality of battery cells may be maintained in a state of being stacked with each other.

Further, according to the embodiments of the present invention, since the cooling plate includes the accommodating grooves, it is possible to increase workability during manufacturing compared to the recesses.

Further, according to the embodiments of the present invention, it is possible to prevent a laser beam from penetrating the battery cell in a process of coupling the cooling housing with the front and rear cover parts or the cover plate.

Furthermore, according to the embodiments of the present invention, since the cooling housing is formed as a single piece through an extrusion process, the manufacturing time and costs may be greatly reduced.

BRIEF DESCRIPTION OF THE DRAWINGS

The above and other objects, features and other advantages of the present invention n will be more clearly understood from the following detailed description taken in conjunction with the accompanying drawings, in which.

DETAILED DESCRIPTION OF THE INVENTION

Figure 1:
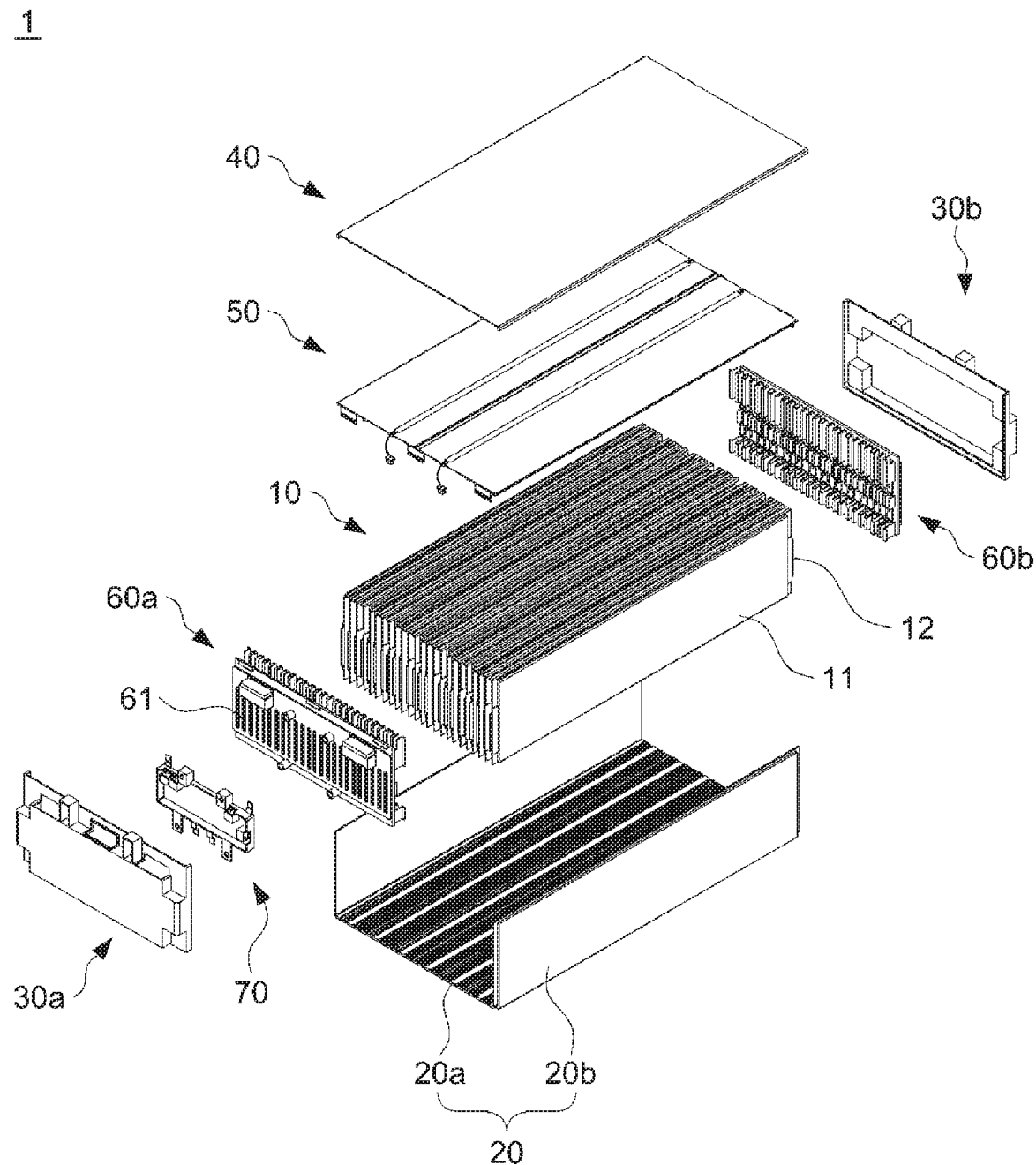
FIG. 1 is an exploded perspective view illustrating a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 2:
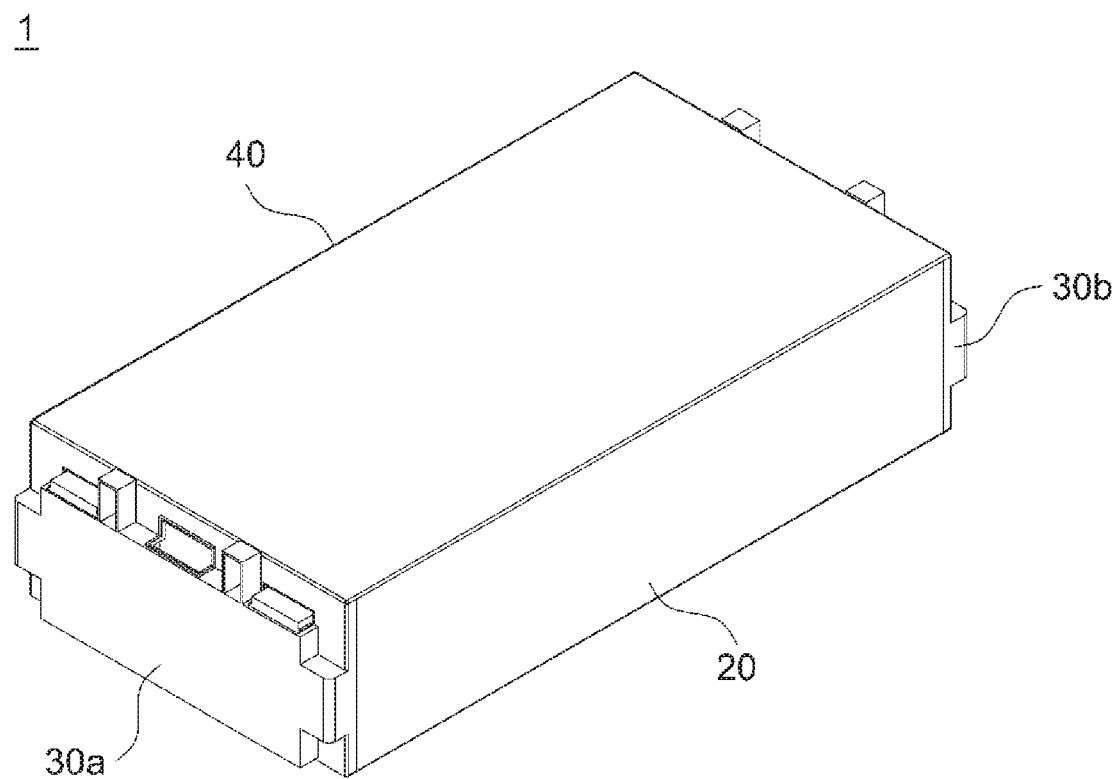
FIG. 2 is a perspective view illustrating the battery module according to the embodiment of the present invention.

FIG. 1 is an exploded perspective view illustrating a battery module 1 according to an embodiment of the present invention, and FIG. 2 is a perspective view illustrating the battery module 1 according to the embodiment of the present invention.

Referring to FIGS. 1 and 2, the battery module 1 according to the embodiment of the present invention includes: a battery group 10 formed by stacking a plurality of battery cells 11; a cooling housing 20 which is configured to house the battery group 10, and is made of a material having a high thermal conductivity to cool the battery group 10; a sensing module assembly 50 located on an upper side of the battery group 10 to connect bus bar assemblies 60a and 60b located on both sides (front and rear of the battery module 1) of the battery group 10 in a longitudinal direction thereof and a sensing board 70 located at one side (front or rear of the battery module 1) with each other; a cover plate 40 disposed on an upper side of the sensing module assembly 50; the bus bar assemblies 60a and 60b which are located on the front and rear of the battery group 10 (both sides of the battery group 10 in a direction in which electrode tabs 12 are extended), and are connected to a plurality of electrode tabs 12 so as to electrically connect the plurality of battery cells 11 with each other; the sensing board 70 connected to an outside of any one bus bar assembly 60a of the bus bar assemblies 60a and 60b to detect voltages of the plurality of battery cells 11; and front and rear cover parts 30a and 30b which are located at outermost front and rear of the battery group 10 to protect and fix the battery group 10 when coupling the cooling housing 20 and the cover plate 40 with each other.

As described above, in the battery module 1 according to the embodiment of the present invention, all six outer surfaces of the battery group 10 are sealed by the cooling housing 20, the front and rear cover parts 30a and 30b, and the cover plate 40. Therefore, the battery module may be protected from an external impact or foreign matters, and strength and rigidity thereof may be reinforced, such that assemblability may be improved.

Meanwhile, the cooling housing 20 may be formed so as to surround three sides of sides from which the electrode tab 12 of the battery group 10 is not drawn. Specifically, the cooling housing 20 includes: a cooling plate 20a which surrounds a lower side of the battery group 10 (i.e., one side of both sides of the battery group 10 in a direction perpendicular to a direction in which the plurality of battery cells 11 are stacked); and side plates 20b which surround the both sides (i.e. outsides of the respective battery cells 11 located on both ends) of the battery group 10 in the direction in which the plurality of battery cells 11 are stacked.

More specifically, the above-described cooling plate 20a may be located on one side (preferably, on a lower side in the drawing) of the remaining sides of the circumferential surfaces of the battery group 10 on planes perpendicular to the direction in which the battery cells 11 are stacked except for the sides in which the electrode tabs 12 are located, and the above-described pair of side plates 20b may be located on both sides of the battery group 10 in the direction in which the battery cells 11 are stacked.

Hereinafter, the above-described cooling housing 20 will be described as surrounding the lower side and both sides of the battery group 10, but it is not limited thereto, and the cooling housing 20 may surround the upper side and both sides of the battery group 10. As described above, the cooling housing 20 is formed in a structure that surrounds three surfaces of the battery group 10, thus to support and protect the battery group 10 housed therein.

In addition, since the cooling housing 20 is made of a material having a high thermal conductivity, it may perform the same function as a conventional cooling member. As described above, the battery group 10 may be cooled through the cooling housing 20 surrounding the three surfaces of the battery group 10. Further, since an additional member such as a cooling member or cooling fins is not required, a volume of the battery module 1 may be minimized to improve energy density of the battery module 1.

Meanwhile, the side plates 20b may vertically extend from both sides of the cooling plate 20a to the battery group 10 side, and the side plates 20b and the cooling plate 20a may be formed as a single piece through an extrusion process or the like. That is, the cooling housing 20 may be formed in an integral U-shape.

Further, the side plates 20b and the cooling plate 20a may be made of the same material, and preferably made of aluminum (AL), for example. However, these plates are not limited to being made of the same material, and may be made of materials different from each other. For example, the cooling plate 20a may be made of a material having a high thermal conductivity to dissipate heat generated in the battery group 10, while the side plates 20b may be made of a material having insulation properties to minimize a temperature deviation between the plurality of battery cells 11.

Figure 3:
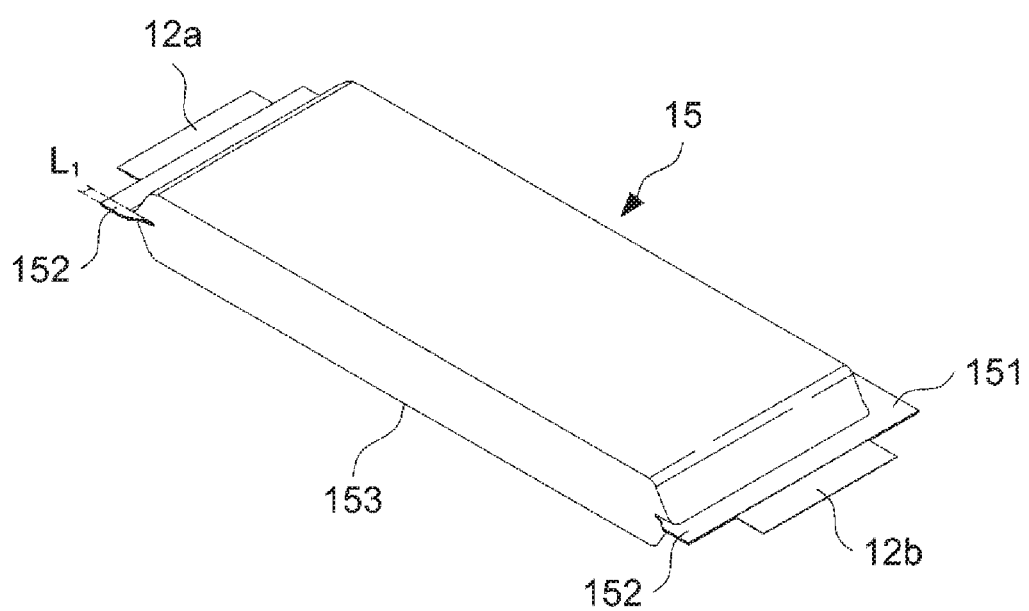
FIG. 3 is a perspective view schematically illustrating a battery cell according to the embodiment of the present invention.

FIG. 3 is a perspective view schematically illustrating the battery cell 11 according to the embodiment of the present invention.

Referring to FIG. 3, the battery cell 11 includes a sheath 15 that houses an electrode assembly (not illustrated) from which the electrode tabs 12a and 12b are drawn. The sheath 15 includes an adhesion part 153 which is adhered to at least one side of the sides of the electrode assembly, and a sealing part 151 formed by adhering the sheath 15 on sides other than the side of the adhesion part 153. The sealing part 151 may include extension parts 152 extending with a predetermined length L1 in a direction perpendicular to the adhesion part 153 at portions adjacent to the adhesion part 153.

Specifically, the sealing part 151 may be formed by adhering the sheath 15 along outer peripheries of the electrode assembly. The sealing part 151 is formed by adhering the sheath 15, and may be formed along four surfaces of circumferences of the electrode assembly in a thickness direction thereof. At this time, the electrode tabs 12a and 12b may be drawn to an outside of the sealing part 151 at both ends of the electrode assembly.

Herein, the volume of the battery module 1 may be increased by a length in which the sealing part 151 is formed. Therefore, in the battery cell 11 according to the embodiment of the present invention, the sealing part 151 is formed along three circumferences of the electrode assembly in the thickness direction thereof not along all four circumferences, and the sheath 15 is formed so as to be adhered to the electrode assembly on at least one surface, such that the volume of the battery module 1 may be reduced.

The sheath 15 may be adhered to at least one side of the electrode assembly. Herein, a portion in which the sheath 15 is adhered to the electrode assembly will be described while referring to the adhesion part 153. The adhesion part 153 may be formed by adhering the sheath to the electrode assembly.

Meanwhile, the adhesion part is not limited to the above-described adhesion part 153 in which the sheath 15 is completely adhered to the electrode assembly, and may mean a side of sides in which the electrode tabs 12a and 12b of the battery cell 11 are not extended except for the sealing part 151 formed by adhering the sheath 15. At this time, an electrolyte or the like contained in the sheath 15 may be present between the adhesion part 153 and the electrode assembly.

In addition, the sealing part 151 may include at least one extension part 152 extending adjacent to the electrode tabs 12*a* and 12*b*. Herein, the extension part 152 may be extended at a portion adjacent to the adhesion part 153 with a predetermined length L1 in the direction perpendicular to the adhesion part 153. Accordingly, a space may be formed between the extension part 152 and the adhesion part 153 by the extended length of the extension part 152. Herein, the extension part 152 may have a length L of several millimeters. The two extension parts 152 may be extended in the same direction and may be extended in a direction perpendicular to the direction in which the electrode tabs 12 are extended. Further, the extension part 152 may be extended from one side (adhesion part 153) in which the electrode tabs 12*a* and 12*b* of the electrode assembly (not illustrated) are not formed.

Furthermore, since the adhesion part 153 is formed on one side of the battery cell 11, cooling efficiency of the battery cell 11 may be improved. The adhesion part 153 may come into contact with the cooling plate 20*a* of the cooling housing 20 capable of cooling the battery cells 11. For example, the plurality of battery cells 11 are stacked side by side so that the adhesion part 153 is located on a down side, and the cooling plate 20*a* capable of cooling the battery group 10 is disposed on the lower side of the battery group 10 so as to come into contact with the adhesion part 153 of the plurality of battery cells 11.

Further, the cooling plate 20*a* of the cooling housing 20 is adhered to the adhesion part 153, and extension parts 152 are extended from both ends of the adhesion part 153 in the direction perpendicular to the adhesion part 153. Thereby, the extension parts 152 may serve to maintain an arrangement of the battery group 10 with respect to the cooling housing 20.

Figure 4:
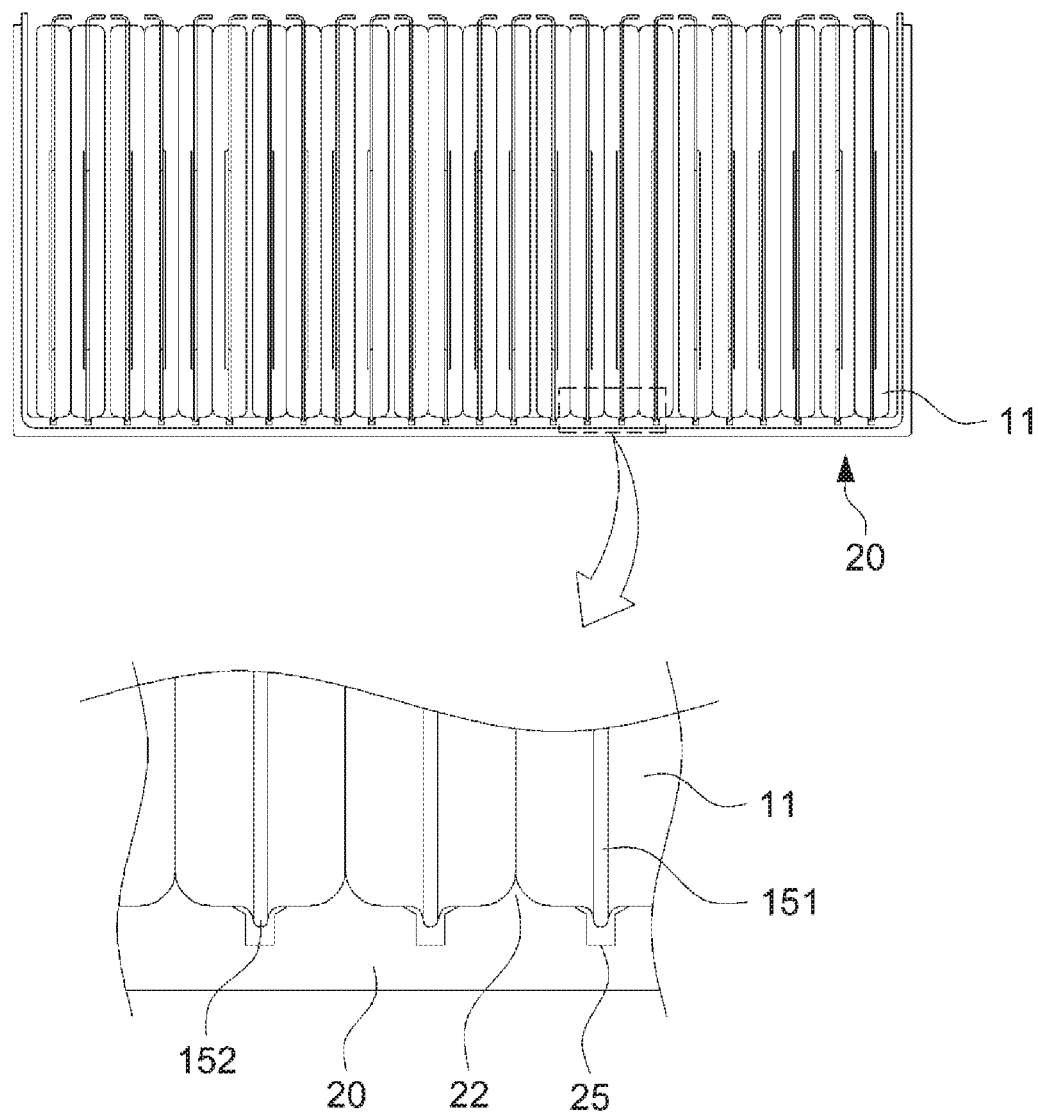
FIG. 4 is a front view and a partially enlarged view thereof illustrating a state in which a battery group is mounted in a cooling housing according to the embodiment of the present invention.
Figure 5:
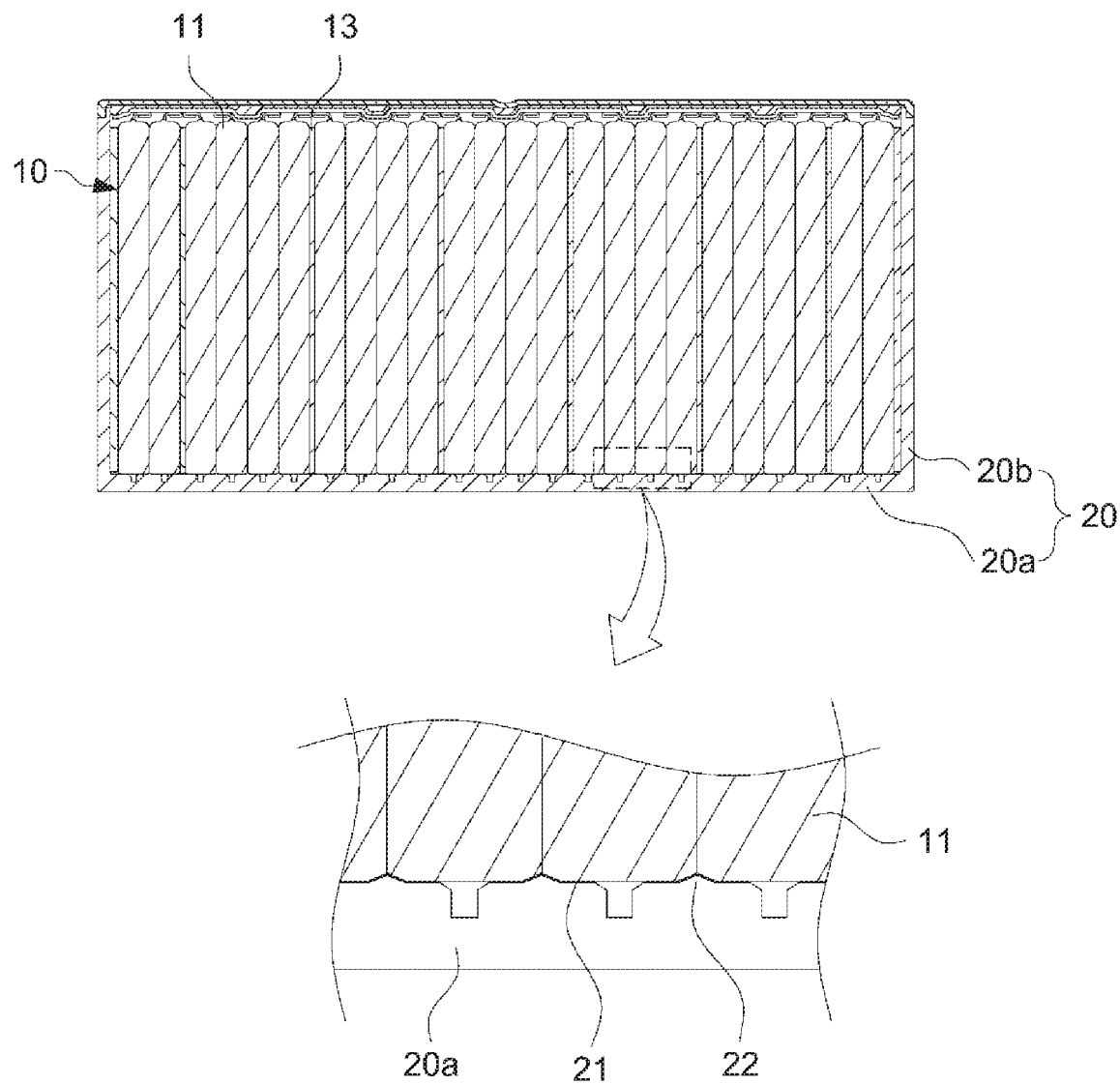
FIG. 5 is a cross-sectional view and a partially enlarged view thereof illustrating an internal structure of the battery module and the state in which the battery group is mounted in the cooling housing according to the embodiment of the present invention.
Figure 6A:
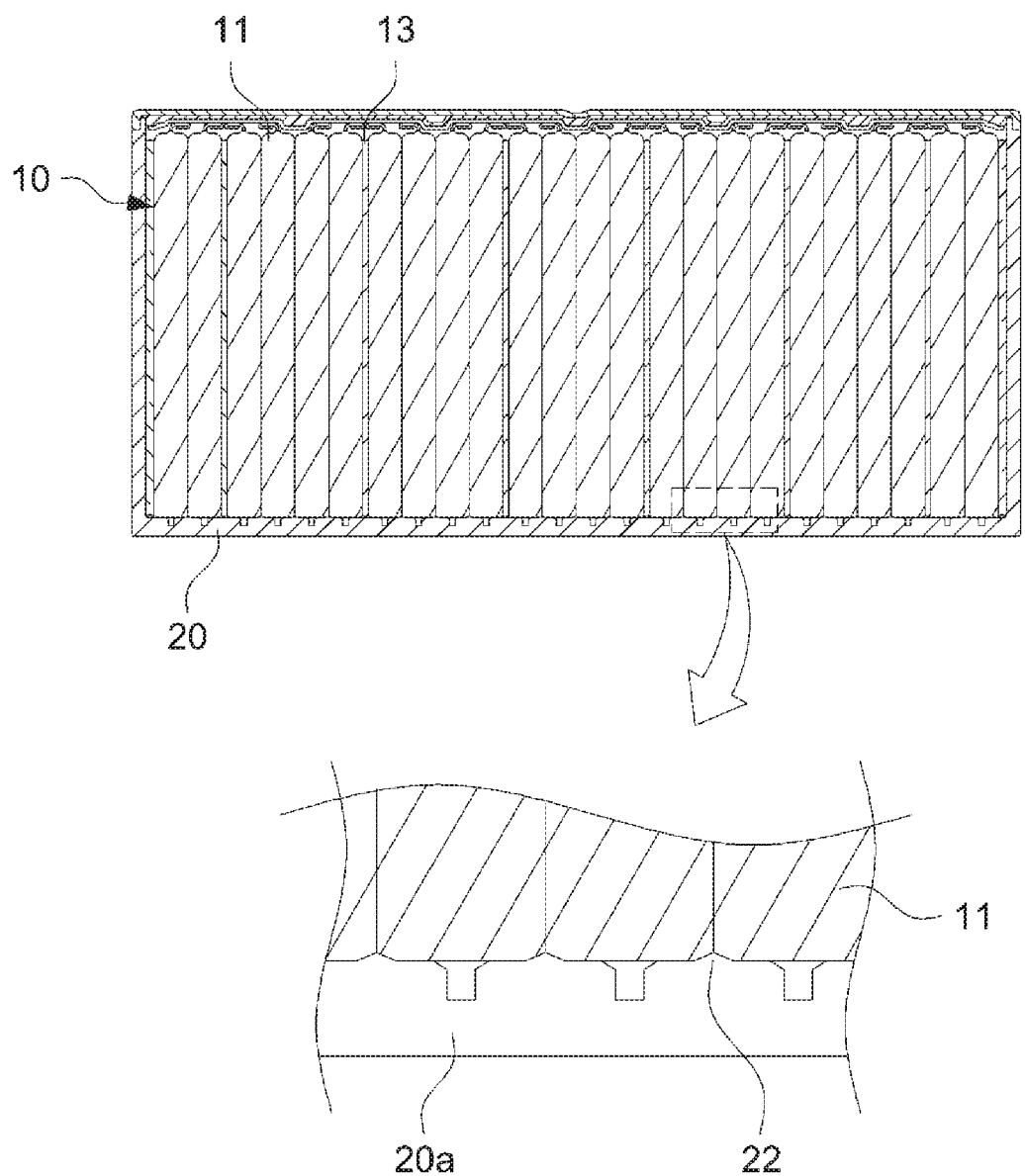
FIG. 6A is a cross-sectional view and a partially enlarged view thereof illustrating a shape of a cooling plate having protrusions formed thereon according to the embodiment of the present invention.
Figure 6B:
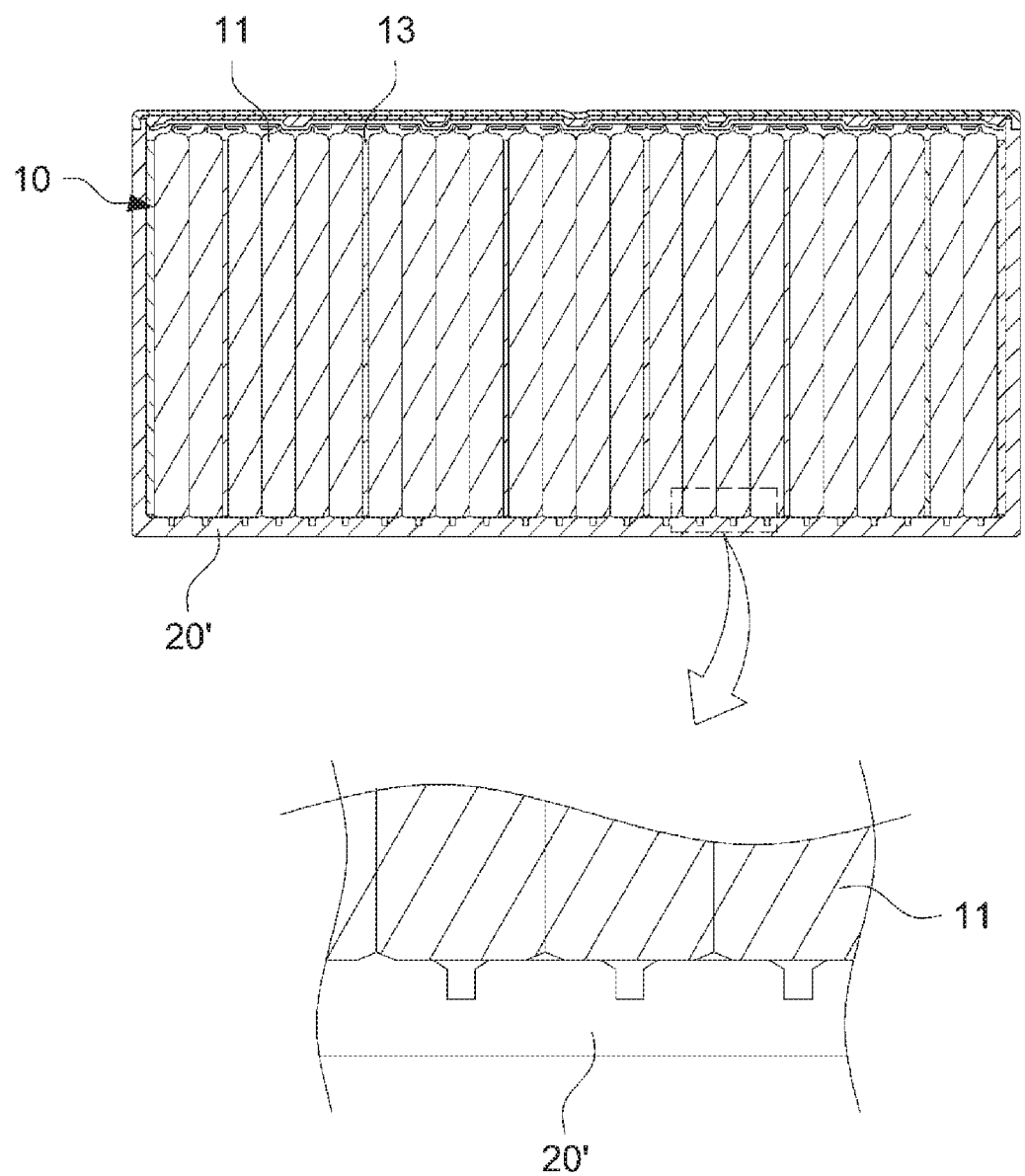
FIG. 6B is a cross-sectional view and a partially enlarged view thereof illustrating a shape of a cooling housing in which the protrusion is not formed.

FIG. 4 is a front view and a partially enlarged view thereof illustrating a state in which the battery group 10 is mounted in the cooling housing 20 according to the embodiment of the present invention, FIG. 5 is a cross-sectional view and a partially enlarged view thereof illustrating an internal structure of the battery module 1 and the state in which the battery group 10 is mounted in the cooling housing according to the embodiment of the present invention, FIG. 6A is a cross-sectional view and a partially enlarged view thereof illustrating a shape of the cooling plate 20*a* having protrusions 22 formed thereon according to the embodiment of the present invention, and FIG. 6B is a cross-sectional view and a partially enlarged view thereof illustrating a shape of a cooling housing 20' in which the protrusion 22 is not formed.

Referring to FIGS. 4 to 6, the plurality of battery cells 11 are stacked side by side, and the plurality of stacked battery cells 11 are placed on the cooling plate 20*a*, such that the plurality of battery cells 11 may be cooled by the cooling housing 20.

Meanwhile, the cooling plate 20*a* may have curved surfaces formed according to a shape of the adhesion parts 153 of the plurality of battery cells 11.

Specifically, the cooling plate 20*a* of the cooling housing 20 may have a plurality of protrusions 22 formed to have a curved surface corresponding to the shape of a portion of the adhesion part 153, so as to come into contact with the adhesion part 153 of the battery cell 11 across the widest surface thereof. At this time, each of the above-described plurality of protrusions 22 may be disposed between the adhesion parts 153 formed in two adjacent battery cells 11, and is formed corresponding to the partially curved shape of the two adhesion parts 153, thereby a contact area between the adhesion parts 153 and the cooling plate 20*a* may be maximized.

In addition, the cooling plate 20*a* may have a plurality of recesses 25 formed in a groove shape to receive the extension parts 152 of the battery cell 11. The recess 25 may be an empty space formed in the cooling plate 20*a* at a predetermined interval. The recesses 25 may be formed in the cooling plate 20*a* in a direction parallel to a direction in which the battery cells 11 are arranged. The extension parts 152 protruding outward from the battery cells 11 are received in the recesses 25, such that the stacked state of the battery cells 11 may be maintained (the first embodiment of the cooling housing 20).

In addition, the battery group 10 may include the plurality of battery cells 11 formed by stacking, and may further include elastic members 13 disposed between bundles of the predetermined number of the battery cells 11 among the plurality of battery cells 11. At this time, the elastic member 13 may buffer the battery cells 11 from swelling, and may prevent an external shock and a vibration from being transmitted to the battery cells 11. However, it is not limited to the configuration in which the elastic member 13 is disposed between the bundles of the predetermined number of the battery cells 11, for example, the elastic members 13 are disposed between two bundles of the battery cells 11 and between four bundles of the battery cells 11, as illustrated in FIG. 5.

Furthermore, a heat transfer member 21 such as a gap filler or a thermally conductive adhesive may be applied between the battery group 10 and the cooling plate 20*a* to increase a contact strength between the battery group 10 and the cooling plate 20*a*. Specifically, the heat transfer member 21, such as a thermally conductive adhesive having thermal conductive applied between the battery group 10 and the cooling plate 20*a* in a thinly spread state, they maximizing the contact surface between the battery group 10 and the cooling plate 20*a*. In addition, since the space between the battery group 10 and the cooling plate 20*a* is minimized, the heat transfer efficiency in cooling the battery group 10 of the cooling housing 20 may be increased.

Meanwhile, after applying the heat transfer member 21 to the cooling plate 20*a* according to the structure of the U-shaped cooling housing 20, the battery group 10 is placed on the heat transfer member 21. In this case, the heat transfer member 21 may be applied in a minimum amount, then the heat transfer member 21 may be thinly spread, which will be described in detail below.

Meanwhile, Table 1 below shows data on simulation results related to temperatures such as a maximum temperature (° C.) in the battery cell, a minimum temperature (° C.) in the battery cell, a difference between the maximum temperature (° C.) and the minimum temperature (° C.), and a maximum thermal resistance (K/M) in the battery module in a case in which the protrusions 22 are formed on the cooling plate 20*a* of the cooling housing 20 as illustrated in FIG. 6A (left side), and a case in which the protrusion 22 is not formed on the cooling housing 20' as illustrated in FIG. 6B (tight side).

At this time, the above-described simulation may be executed under conditions of an initial flow rate of 1 LPM of cooling water flowing into a heat sink, etc. outside the battery module 1, an initial temperature of 15° C., and a current of 80 A of the battery cell 11.

TABLE 1

|  | Cooling housing 20 having protrusions formed therein | Cooling housing 20 without protrusion |
|---|---|---|
| Maximum temperature in battery cell | 35.7° C. | 38.5° C. |
| Minimum temperature in battery cell | 27.2° C. | 29.1° C. |
| Difference between maximum and minimum temperature | 8.5° C. | 9.4° C. |
| Maximum heat resistance | 1.8 K/W | 2.2 K/W |

In the case of the battery module 1 having the protrusions 22 formed on the cooling housing 20 as described above, the temperature in the battery module 1 is lower due to higher cooling efficiency than the case in which the protrusion 22 is not formed, thereby the thermal resistance therein may be lowered.

Figure 7A:
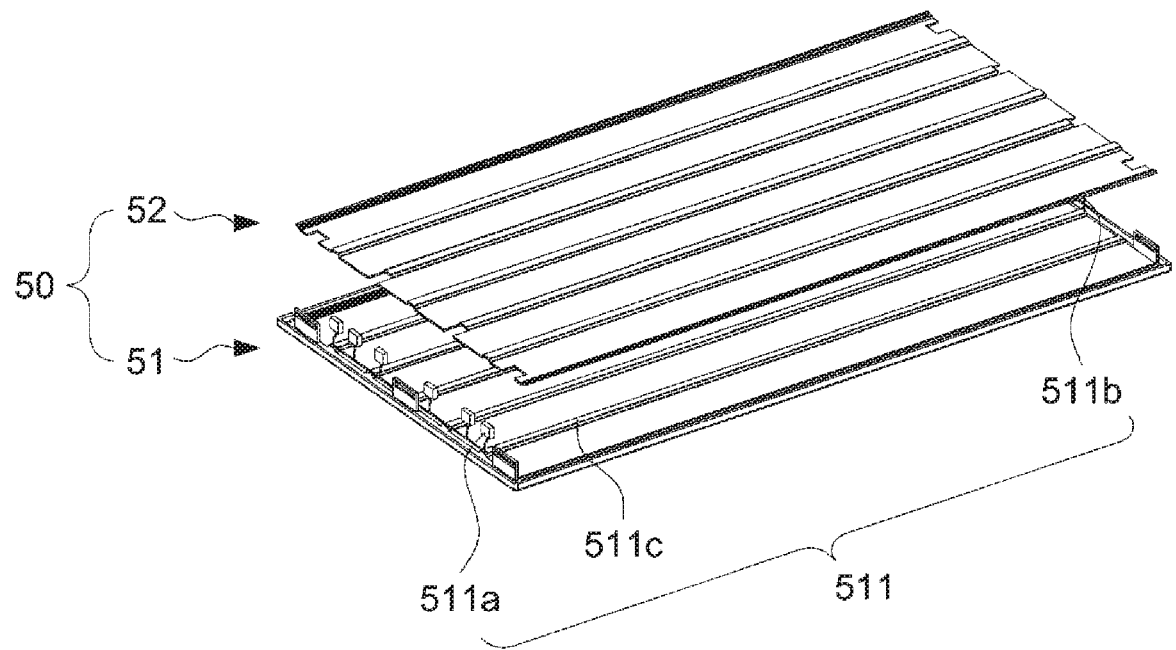
FIG. 7A is an exploded perspective view illustrating a sensing module assembly according to the embodiment of the present invention.
Figure 7B:
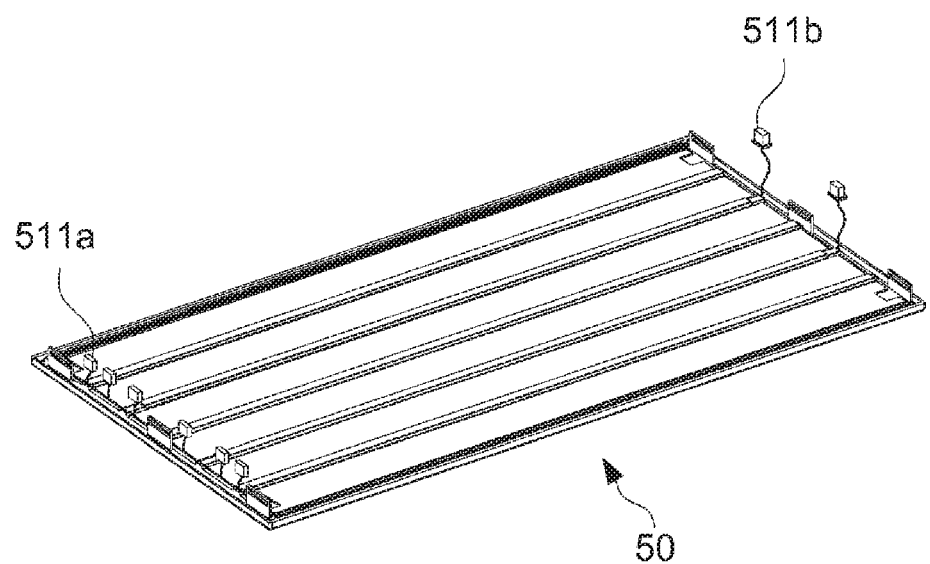
FIG. 7B is a perspective view illustrating the assembled sensing module assembly according to the embodiment of the present invention.
Figure 8:
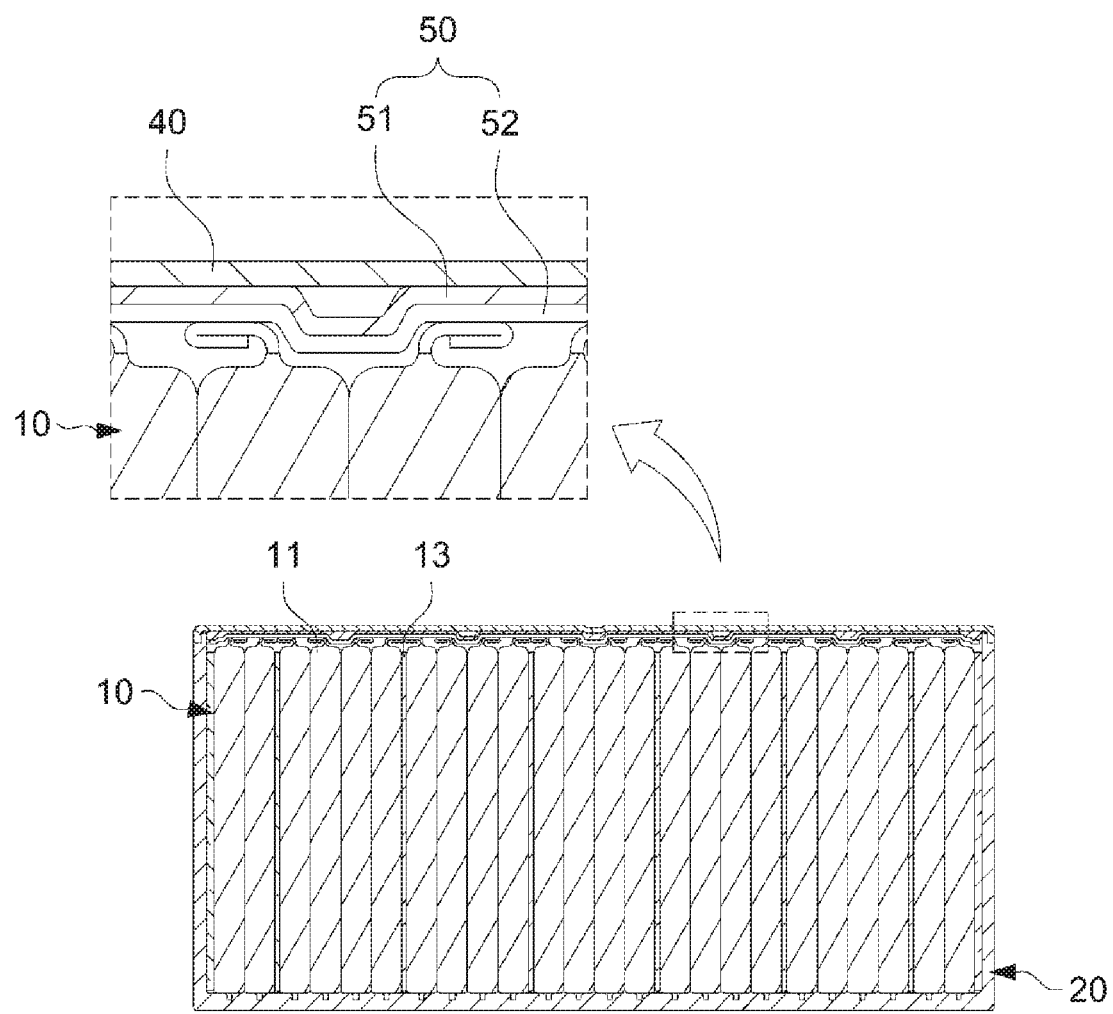
FIG. 8 is a cross-sectional view and a partially enlarged view thereof illustrating the internal structure and an upper portion of the battery module according to the embodiment of the present invention.
Figure 9:
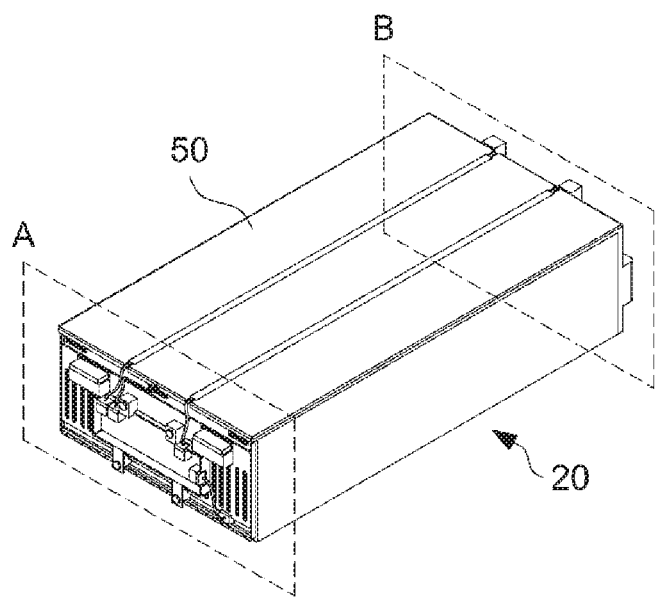
FIG. 9 is a perspective view illustrating a connection relationship between a sensing board, the sensing module assembly, and the bus bar assemblies of the battery module according to the embodiment of the present invention, and partially enlarged front and rear perspective views of sections A and B.
Figure 9:
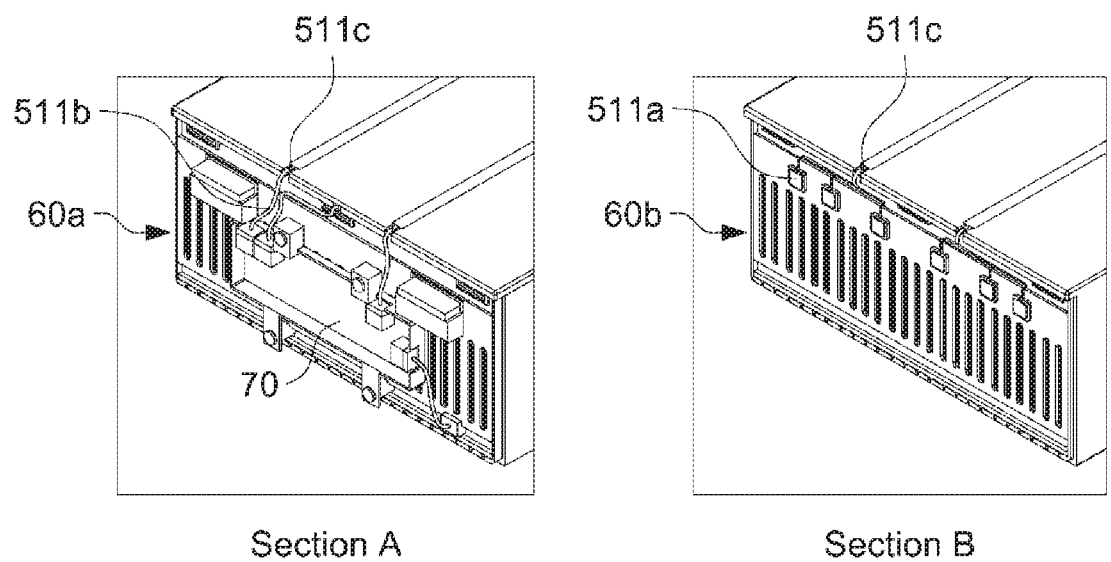

FIG. 7A is an exploded perspective view illustrating the sensing module assembly 50 according to the embodiment of the present invention, and FIG. 7B is a perspective view illustrating the assembled sensing module assembly 50 according to the embodiment of the present invention, FIG. 8 is a cross-sectional view and a partially enlarged view thereof illustrating the internal structure and an upper portion of the battery module 1 according to the embodiment of the present invention, and FIG. 9 is a perspective view illustrating a connection relationship between the sensing board 70, the sensing module assembly 50, and the bus bar assemblies 60*a* and 60*b* of the battery module 1 according to the embodiment of the present invention, and partially enlarged front and rear perspective views of sections A and B.

Referring to FIGS. 7 to 9, the sensing module assembly 50 may include a plate-shaped sensing module member 51 and an elastic pad 52 having a size corresponding to the sensing module member 51. At this time, the elastic pad 52 has a compressive reaction force, so as to press the battery group 10 downward from the upper side of the battery group 10 to make the battery group 10 more closely come into contact with the cooling plate, and the surface contact between the battery group 10 and the cooling plate 20*a* is maximized, such that the efficiency of heat transfer in cooling the battery group 10 of the cooling housing 20 may be increased.

The sensing module member 51 may include at least one voltage sensing connection member 511 which is connected to the bus bar assembly 60*b* on one side thereof, that is, on the side in which the sensing board 70 is not disposed (the rear of the battery module 1 in the drawing), and is connected to the sensing board 70 on the other side thereof. Specifically, the voltage sensing connection member 511 may include a first connection member 511*a* connected to the rear bus bar assembly 60*b*, a second connection member 511*b* connected to the sensing board 70 on the front of the battery group 10, and a connection wire 511*c* for connecting the first connection member 511*a* with the second connection member 511 *b*.

In addition, at least a portion of the sensing board 70 may be in electrical contact with at least a portion of the front bus bar assembly 60*a* to be electrically connected thereto, and may be electrically connected to the rear bus bar assembly 60*b* through the first connection member 511*a*. Thereby, a voltage signal of the battery group 10 detected by the rear bus bar assembly 60*b* may be transmitted to the sensing board 70 through the voltage sensing connection member 511 (Section B in FIG. 9), and the sensing board 70 connected to the front bus bar assembly 60*a* may measure a voltage of the battery group 10 to confirm the voltage state thereof (Section A in FIG. 9).

Meanwhile, the sensing board 70 illustrated in FIG. 9 may include a printed circuit board (PCB), for example. Herein, the shape of the sensing board 70 and a connection position with the bus bar assembly 60*a* are illustrated as an example, but it is not limited thereto, and it will be apparent to those skilled in the art that they may be changed depending on the circuit design and the shape of the bus bar assembly 60*a*.

Further, the voltage sensing connection member 511 may be located and fixed between the sensing module member 51 and the elastic pad 52. The sensing module member 51 and the elastic pad 52 are made of an insulation material, such that the possibility of electrical communication between the connection wire 511*c* and the battery group 10 may be blocked.

Meanwhile, the first connection member 511*a*, the second connection member 511*b*, and the connection wire 511*c* of the sensing module member 51 are merely illustrated as an example, and it is not limited thereto. Any method may be used so long as it can sufficiently transmit a voltage signal on one side of the battery group 10 to the sensing board 70 on the other side, for example, transmit a voltage signal of the battery group 10 detected by the rear bus bar assembly 60*b* to the front sensing board 70 through a flexible print circuit.

Furthermore, the sensing module assembly 50 and the cover plate 40 are described herein as a separate component, respectively, but it is not limited thereto. The sensing module assembly 50 and the cover plate 40 may be configured as one component to perform both the connection function between the sensing board 70 and the bus bar assembly 60*b* and the protection function of the battery module 1.

Figure 10:
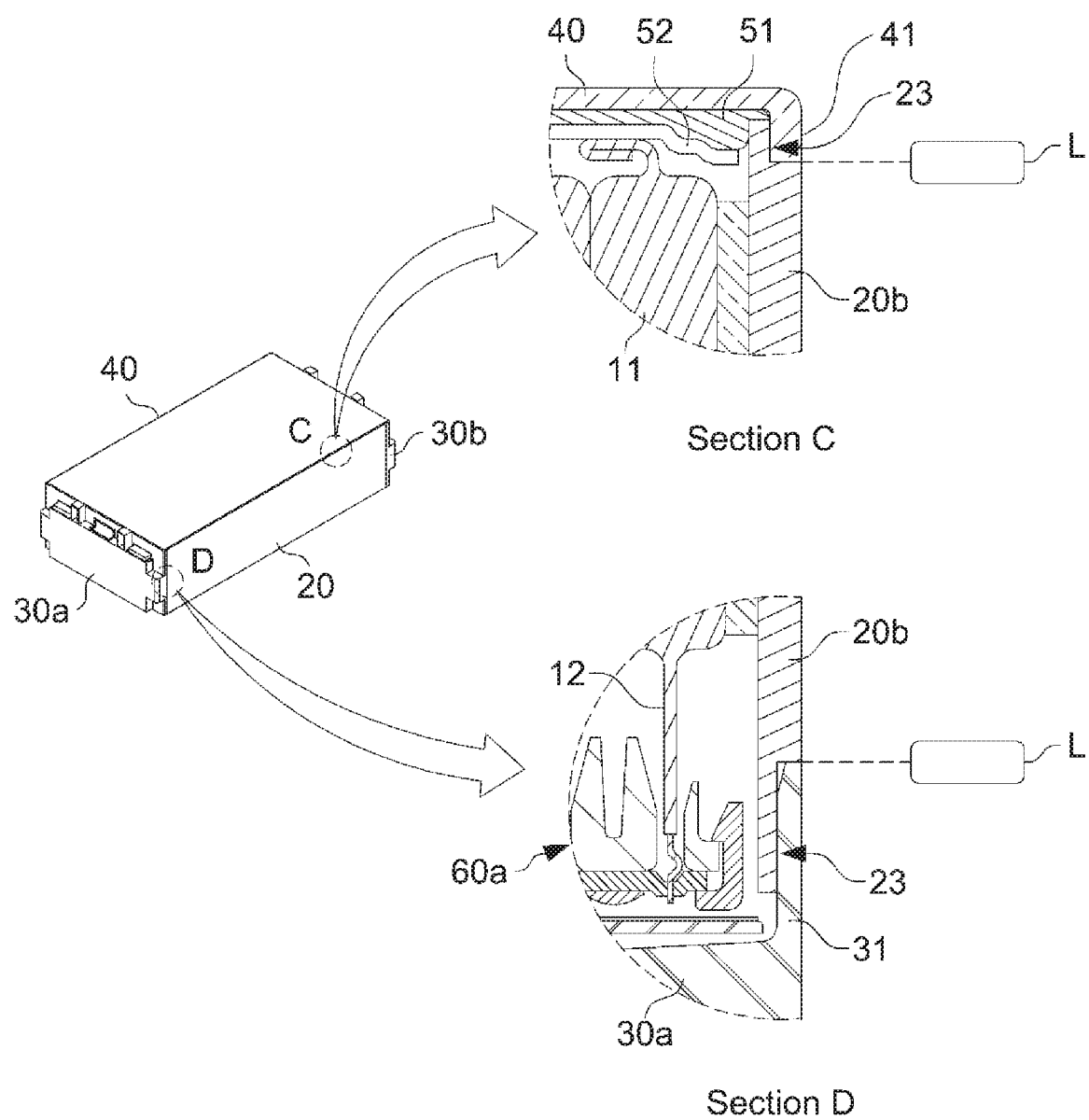
FIG. 10 is a perspective view illustrating a coupling structure between the cooling housing and the cover plate according to the embodiment of the present invention, and a coupling structure between the cooling housing and a front cover part, and partially enlarged cross-sectional views of sections C and D.

FIG. 10 is a perspective view illustrating a coupling structure between the cooling housing 20 and the cover plate 40 according to the embodiment of the present invention, and a coupling structure between the cooling housing 20 and a front cover part 30*a*, and partially enlarged cross-sectional views of sections C and D.

Referring to FIG. 10, the side plate 20*b* of the cooling housing 20 may include stepped parts 23 formed at each edge thereof coupled with the front and rear cover parts 30*a* and 30*b*, and the cover plate 40, respectively. Further, each of the front and rear cover parts 30*a* and 30*b*, and the cover plate 40 may include vertical parts 31 and 41 formed at each edge thereof by extending at right angles therefrom. Specifically, the side plate 20*b* of the cooling housing 20 may include the stepped parts 23 formed in a step shape at each edge thereof coupled with the front and rear cover parts 30*a* and 30*b*, and at the edge thereof coupled with the cover plate 40. Further, each of the front and rear cover parts 30*a* and 30*b*, and the cover plate 40 may include the vertical parts 31 and 41 formed at each edge thereof coupled with the side plate 20*b* of the cooling housing 20 by extending at right angles so as to correspond to the stepped parts 23.

At this time, the vertical parts 31 and 41 may be located with being in contact with the outsides of the stepped parts 23, and the cooling housing 20 (i.e., the side plate 20*b*) and each of the front and rear cover parts 30*a* and 30*b*, and the cooling housing 20 (i.e., the side plate 20*b*) and the cover plate 40 may be bonded and coupled with each other by welding or the like. As described above, the vertical parts 31 and 41 may be located outside the stepped parts 23. Therefore, even when the battery cells 11 are expanded with use of the battery module 1, it is possible to prevent the battery module 1 from being broken by a tensile force applied in a direction in which the plurality of battery cells 11 are stacked. Specifically, the stepped parts 23 are located inside the vertical parts 31 and 41, thus to closely come into contact with the vertical parts 31 and 41 in a direction perpendicular to a direction in which the above-described tensile force is applied. Therefore, even when the battery cells 11 are expanded, the stepped parts 23 may be supported by the vertical parts 31 and 41, and the possibility of breakage of the battery module 1 may be reduced.

Furthermore, the above-described parts may be bonded to each other by laser beam welding. At this time, a beam emitted from a laser L irradiated on a bonding portion may be prevented from being irradiated to the battery group 10 inside the cooling housing 20 by the stepped parts 23. Specifically, the cooling housing 20 and each of the front and rear cover parts 30a and 30b, and the cooling housing 20 and the cover plate 40 may be bonded to each other at the ends of the vertical parts 31 and 41, respectively. As described above, since the stepped parts 23 are located inside the vertical parts 31 and 41, the stepped parts 23 may prevent the laser beam emitted from the laser L from penetrating the cooling housing 20 and reaching the battery group 10 inside the cooling housing 20, thereby improving the stability during manufacturing the battery module 1.

Figure 11:
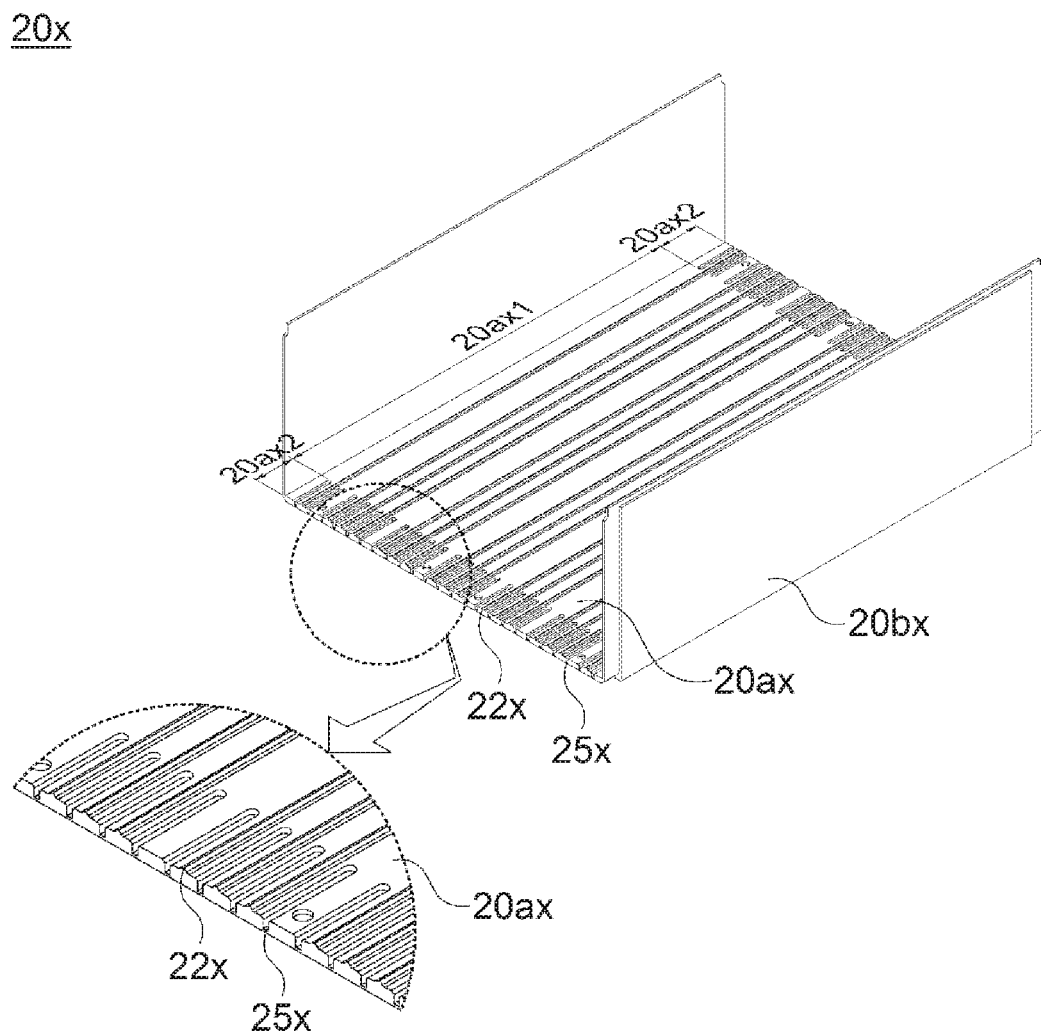
FIG. 11 is a perspective view and a partially enlarged view thereof illustrating a second example of a cooling housing of the battery module according to the embodiment of the present invention.
Figure 12:
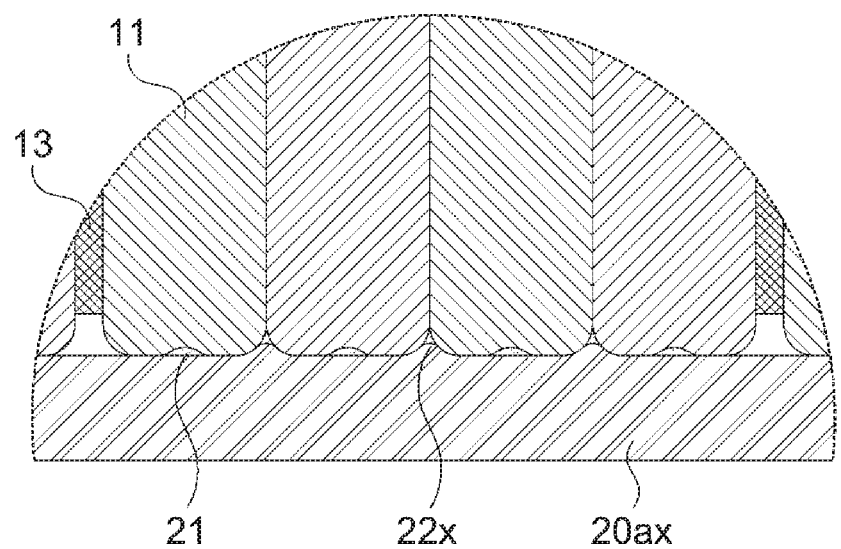
FIG. 12 is a partial cross-sectional view illustrating a state in which the battery group is placed on a first region of the cooling housing illustrated in FIG. 11.

FIG. 11 is a perspective view and a partially enlarged view thereof illustrating a second example of a cooling housing 20x of the battery module 1 according to the embodiment of the present invention, and FIG. 12 is a partial cross-sectional view illustrating a state in which the battery group 10 is placed on a first region of the cooling housing 20x illustrated in FIG. 11.

Referring to FIGS. 11 and 12, a cooling plate 20ax on which the battery group 10 is placed may include a first region 20ax1 formed therein, on which the adhesion parts 153 of the plurality of battery cells 11 are placed, and second regions 20ax2 formed on both sides thereof, on which the extension parts 152 formed in the sealing part 151 on sides from which the electrode tabs 12 are extended are placed. That is, the second region 20ax2, the first region 20ax1, and the second region 20ax2 may be sequentially arranged on the cooling plate 20ax based on the direction from which the electrode tabs 12 are drawn. Moreover, the front and rear bus bar assemblies 60a and 60b may be placed on the second region 20ax2.

Specifically, in a case of the second example of the cooling housing 20x, the cooling housing 20x may include the cooling plate 20ax and side plates 20by formed at both ends of the cooling plate 20ax in the direction in which the battery cells 11 are stacked in this case, the cooling plate 20ax may have a plurality of protrusions 22x formed thereon, which are the same as the protrusions 22 of the first embodiment of the above-described cooling housing 20. That is, the plurality of protrusions 22x may be formed on the cooling plate 20ax over the first region 20ax1 and the second regions 20ax2.

Meanwhile, each of the second regions 20ax2 on which the plurality of extension parts 152 of the battery group 10 are placed may have a plurality of recesses 25x formed in a groove shape so as to receive the extension parts 152, respectively. That is, the extension parts 152 protruding outward from the battery cells 11 are received in the recesses 25x, such that the plurality of battery cells 11 may be maintained in a mutually stacked state.

As described above, when removing portions of the first region 20ax1 for forming the recesses 25, the contact area between the cooling plate 20ax and the adhesion parts 153 may be increased, and the overall contact surface between the lower side of the battery group 10 and the cooling plate 20ax is increased, and the cooling efficiency of the battery module 1 may be further increased.

Figure 13:
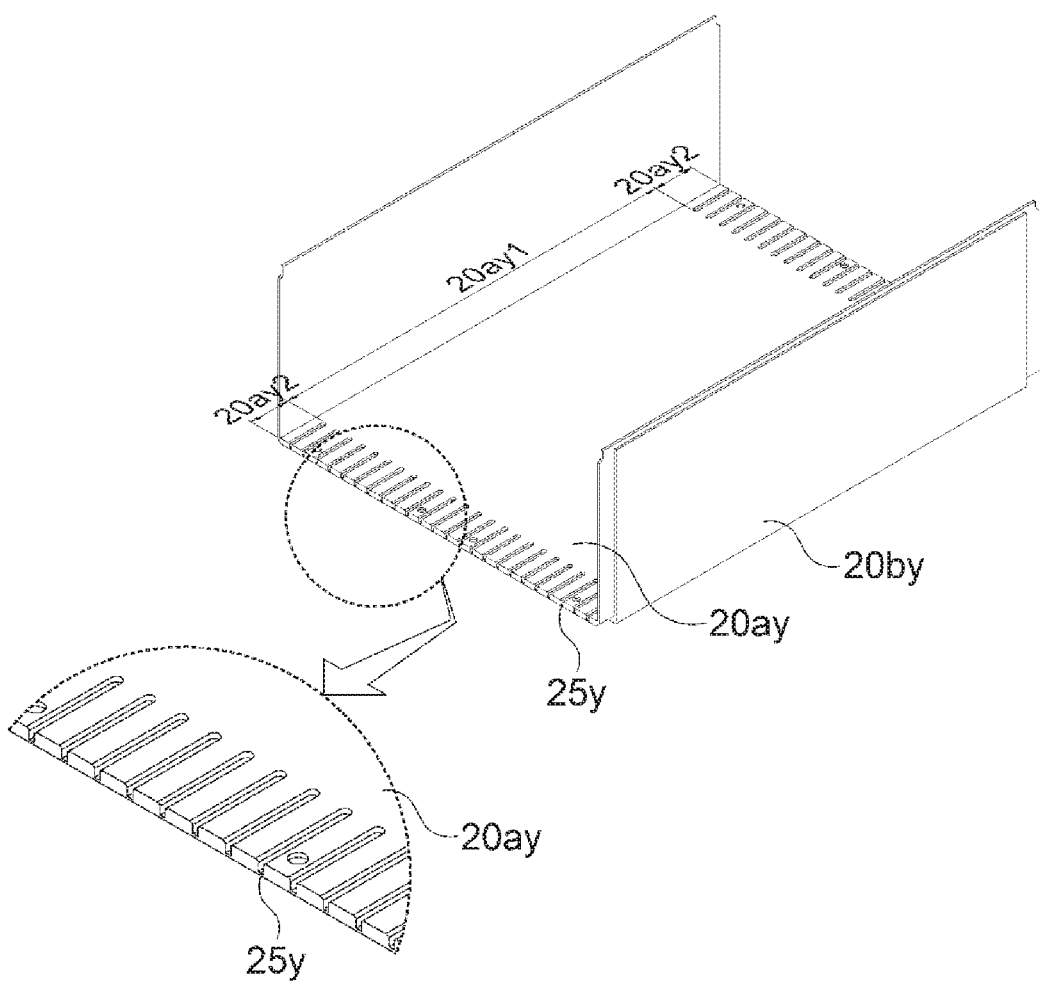
FIG. 13 is a perspective view and a partially enlarged view thereof illustrating a third example of a cooling housing of the battery module according to the embodiment of the present invention.
Figure 14:
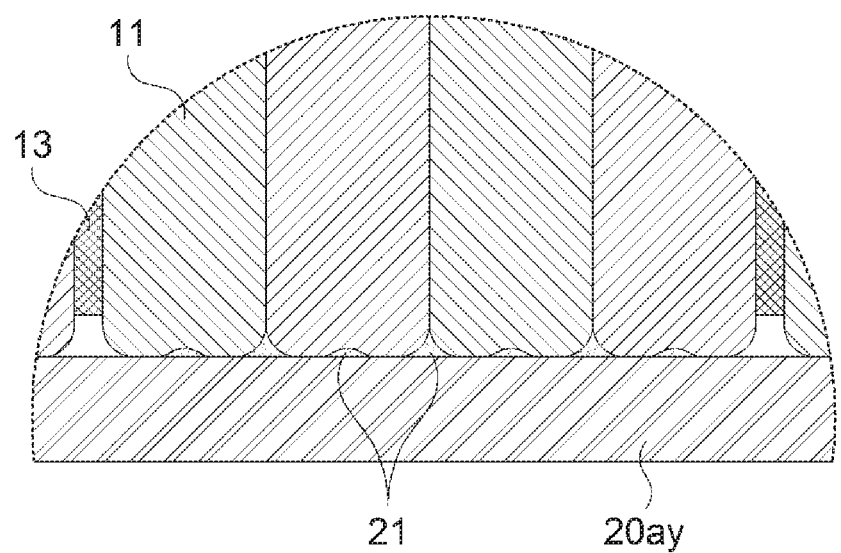
FIG. 14 is a partial cross-sectional view illustrating a state in which the battery group is placed on a first region of the cooling housing illustrated in FIG. 13.

FIG. 13 is a perspective view and a partially enlarged view thereof illustrating a third example of a cooling housing 20y of the battery module 1 according to the embodiment of the present invention, and FIG. 14 is a partial cross-sectional view illustrating a state in which the battery group 10 is placed on a first region of the cooling housing 20y illustrated in FIG. 13.

Referring to FIGS. 13 and 14, in a case of the third example of the cooling housing 20y, the cooling housing 20y may include a cooling plate 20ay and side plates 20by. At this time, the above-described cooling plate 20ay may have a first region 20ay1 formed thereon to be flat without a portion partially protruding or being cut, on which the adhesion parts 153 of the battery group 10 are placed.

Thereby, it is possible to prevent such a problem that the battery cells 11 are mounted on the protrusions 22 of the cooling plate 20a, and the battery cells 11 and the cooling plate 20a do not come into surface contact with each other, due to a tolerance in a width of the stacking direction of the battery cells 11, which may occur during a process of manufacturing the battery cells 11.

In addition, the same structure as the above-described protrusions 22 may not be formed in the second region 20ay2 on which the extension parts 152 and the front and rear bus bar assemblies 60a and 60b are placed. Thereby, the placing surfaces for the above-described bus bar assemblies 60a and 60b are increased, such that the bus bar assemblies 60a and 60b may be easily placed and assembled.

Meanwhile, each of the second regions 20ay2 in which the plurality of extension parts 152 of the battery group 10 are placed may have a plurality of recesses 25y formed in a groove shape to receive each of the plurality of extension parts 152. That is, the extension parts 152 protruding outward from the battery cell 11 are received in the recesses 25y, such that the plurality of battery cells 11 may be stably maintained in the stacked state.

Figure 15:
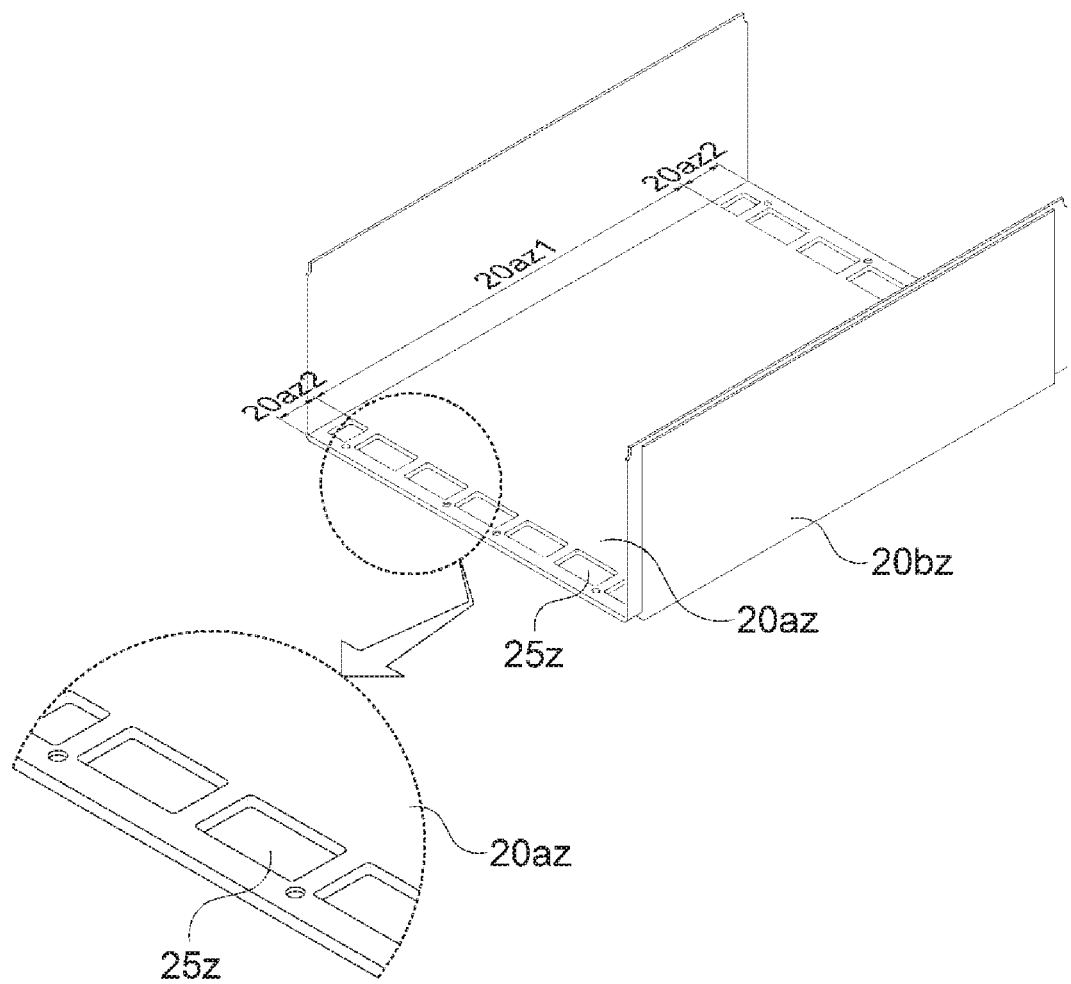
FIG. 15 is a perspective view and a partially enlarged view thereof illustrating a fourth example of a cooling housing of the battery module according to the embodiment of the present invention.
Figure 16:
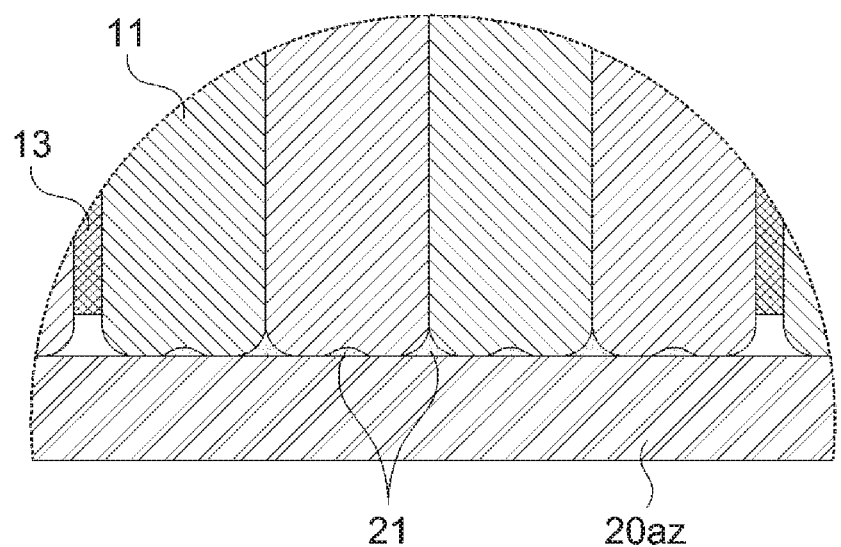
FIG. 16 is a partial cross-sectional view illustrating a state in which the battery group is placed on a first region of the cooling housing illustrated in FIG. 15.

FIG. 15 is a perspective view and a partially enlarged view thereof illustrating a fourth example of a cooling housing 20z of the battery module 1 according to the embodiment of the present invention, and FIG. 16 is a partial cross-sectional view illustrating a state in which the battery group 10 is placed on a first region of the cooling housing 20z illustrated in FIG. 15.

Referring to FIGS. 15 and 16, in a case of the fourth example of the cooling housing 20z, the cooling housing 20z may include a cooling plate 20az and side plates 20bz. At this time, the above-described cooling plate 20az may have a first region 20az1 formed thereon to be flat without a portion partially protruding or being cut, on which the battery group 10 is placed.

Further, the cooling plate 20az may include a second region 20az2 having a plurality of accommodating grooves 25z cut therein to receive one or more extension parts 152, respectively, on which the plurality of extension parts 152 of the battery group 10 are placed.

Specifically, in a case of the above-described recesses 25, 25x and 25v, each of the extension parts 152 of the battery cell 11 is received therein, on the other hand, in a case of the accommodating grooves 25z formed in the cooling plate 20az of the cooling housing 20z, one or more extension parts 152 formed in the battery cells 11 may be simultaneously received therein.

More specifically, the above-described accommodating groove 25z may have a width, corresponding to the direction in which the battery cells 11 are stacked, which is formed in a size capable of receiving at least one extension part 152 formed in at least one adjacent battery cell 11 of the stacked plurality of battery cells 11. In addition, the above-described accommodating grooves 25z may be formed between positions in which the elastic members 13 of the battery group 10 are disposed on the cooling plate 20az, and the extension part 152 of at least one battery cell 11 disposed between two adjacent elastic members 13 may be received in one accommodating groove 25z. Thereby, compared to the recesses 25, 25x, and 25y that should be formed in correspondence with each of the plurality of battery cells 11, workability of the accommodating groove 25z may be increased during manufacturing.

Meanwhile, although the accommodating grooves 25z shown in FIG. 15 are illustrated as capable of receiving two or four extension parts 152 of the adjacent battery 11, but it is merely illustrated as an example, and the present invention is not limited thereto.

Meanwhile, details of the above-described side plates 20bx, 20by and 20bz are the same as those of the side plates 20b of the cooling housing 20, and details of the above-described protrusions 22x and the recesses 25x and 25y are the same as those of the protrusions 22 and the recesses 25 of the cooling housing 20, and therefore will not be described in detail.

In addition, definitions of the above-described first and second regions 20av1 and 20ay2, and the first and second regions 20az1 and 20az2 are the same as those of the first and second regions 20ax1 and 20ax2 of the second example of the cooling housing 20x, and therefore will not be described in detail.

Moreover, the heat transfer member 21 may be applied to the first region 20ax1, 20ay1 and 20az1 of the cooling plate 20ax, 20ay and 20az uniformly. Further, as the battery group 10 is placed on the cooling plate 20ax, 20ay and 20az, an empty space between the n cooling plate 20ax, 20ay and 20az and the plurality of battery cells 11 may be filled with the heat transfer member 21.

Figure 17A:
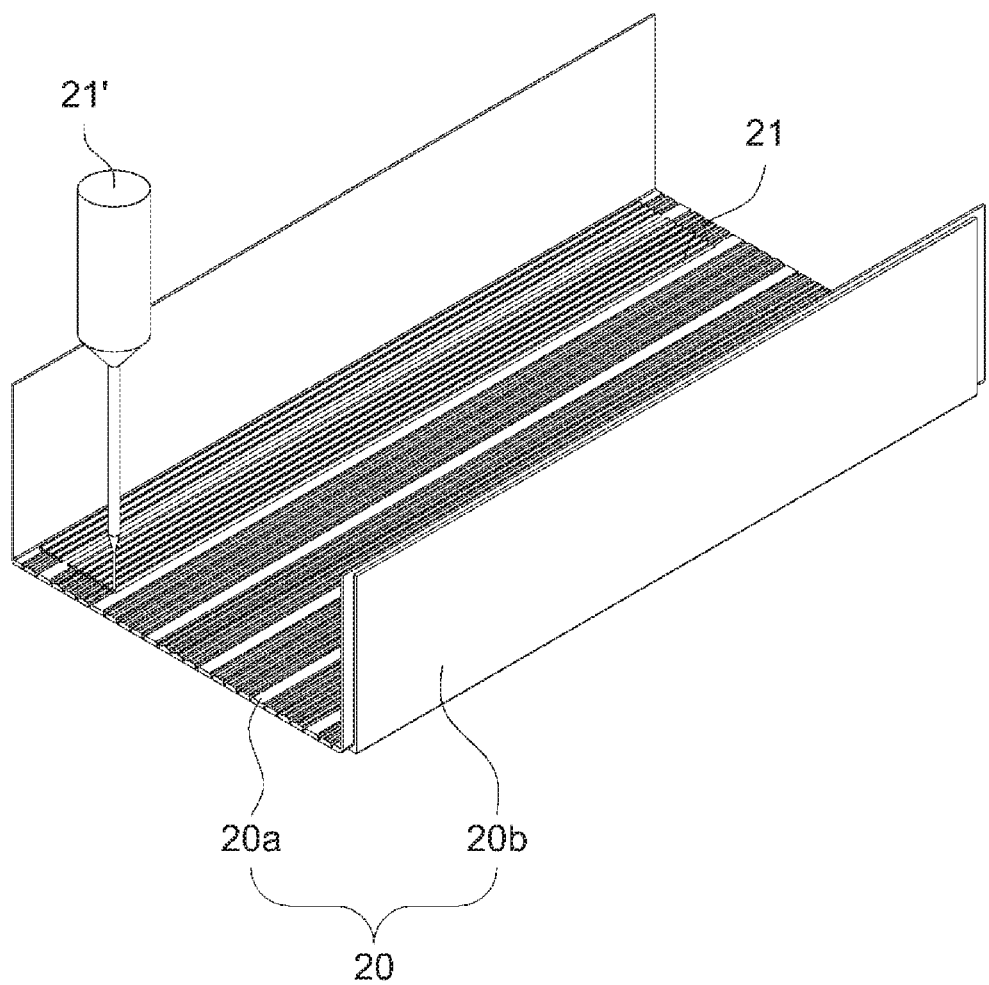
FIGS. 17A to 17C are views illustrating a state in which the battery group is mounted in the cooling housing according to another embodiment.
Figure 17B:
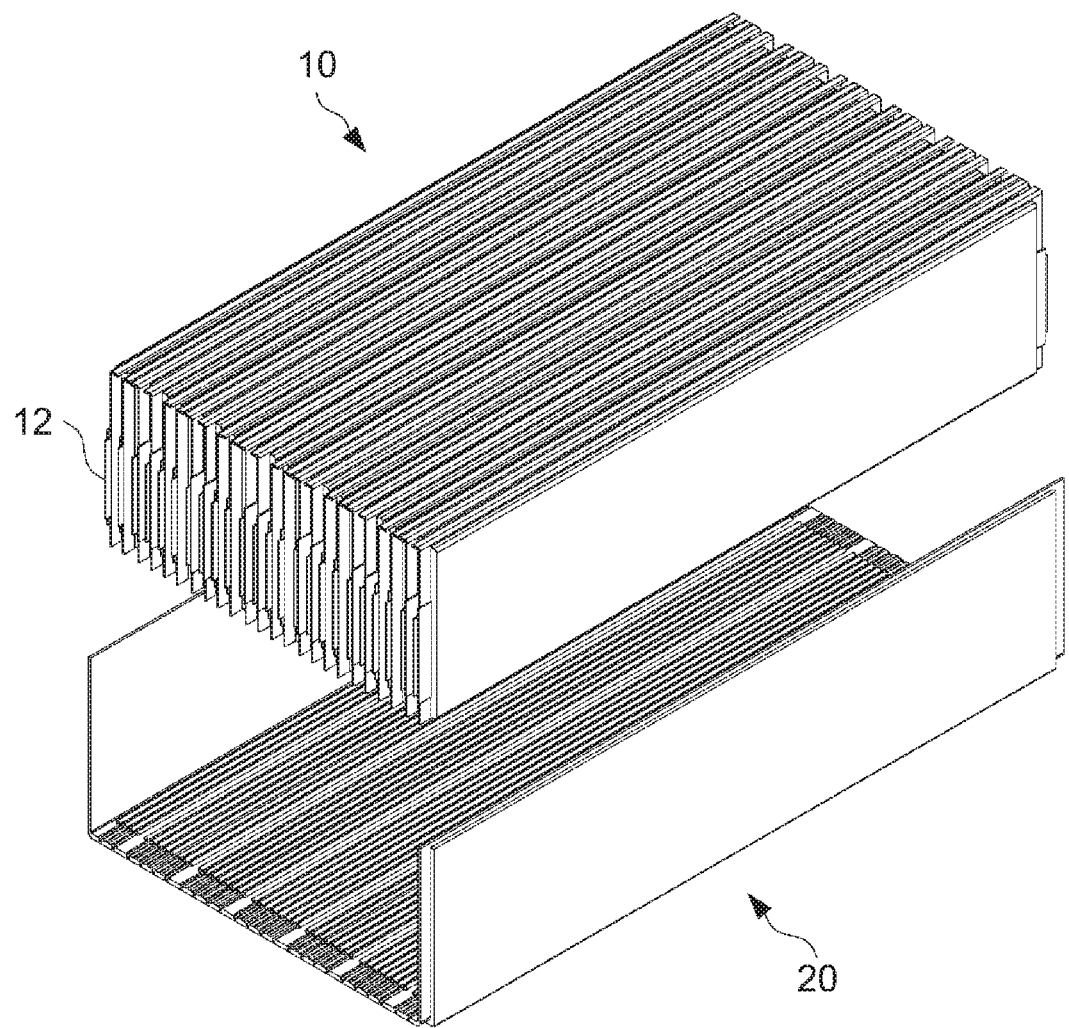
Figure 17C:
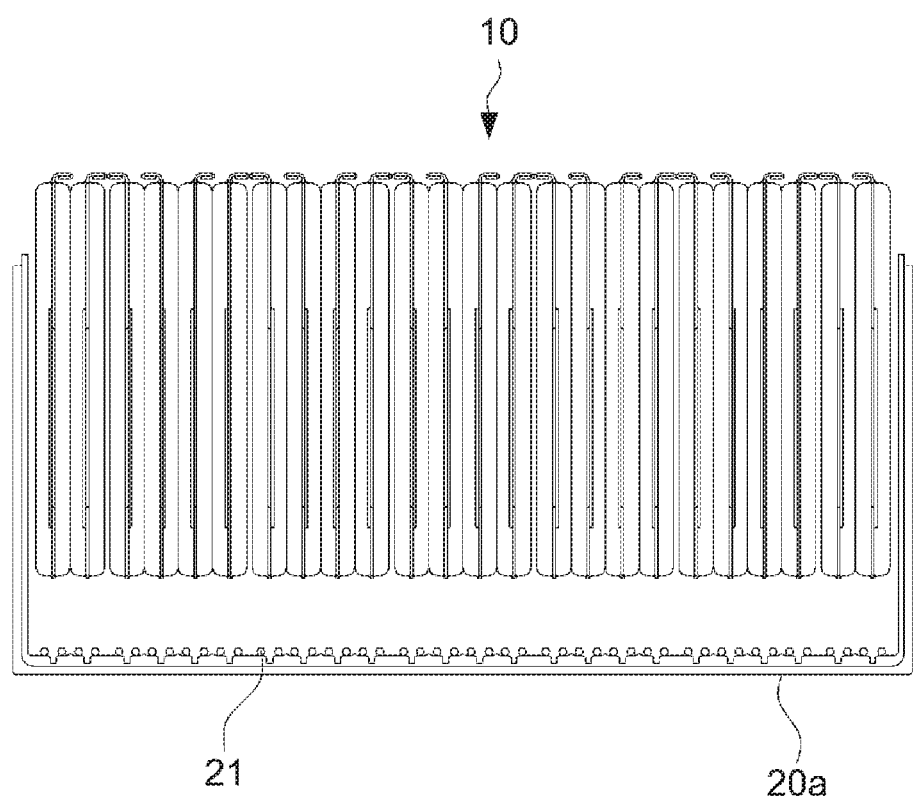

FIG. 17 is views illustrating a state in which the battery group 10 is mounted in the cooling housing 20 according to another embodiment of the present invention. Specifically, FIG. 17A is a perspective view illustrating a state in which a cooling plate 20a is applied with a heat transfer member 21, and FIG. 17B is an exploded perspective view illustrating a state in which the battery group 10 having a plurality of battery cells 11 stacked therein is mounted in the cooling housing 20 applied with the heat transfer member 21, and FIG. 17C is a front view illustrating a state in which the battery group 10 is placed on the cooling plate 20a applied with the heat transfer member 21 as viewed from a side in which the electrode tabs 12 of the battery group 10 are extended.

Referring to FIG. 17 and FIG. 5 again, the battery group 10 may be formed by stacking a plurality of battery cells 11, and the elastic members 13 may be disposed between bundles of the predetermined number of the battery cells 11 among the plurality of battery cells 11. At this time, the plurality of battery cells 11 may be adhered to each other by an adhesive (not illustrated) such as a double-sided tape or the like, and the elastic members 13 may also be adhered to the battery cells 11 on both sides thereof with its own adhesive force. However, this configuration is merely an example for fixing the state of adhesion between the plurality of battery cells 11, but it is not limited thereto, and any method may be used so long as it can adhere a plurality of battery cells 11 to each other, thus to sufficiently maintain the shape of the stacked battery group 10.

Further, the heat transfer member 21 such as a gap filler or a thermally conductive adhesive may be applied to at least a portion of the cooling housing 20 whose one side is opened. In particular, the heat transfer member 21 may be applied to the cooling plate 20a of the cooling housing 20, and may be applied through nozzles 21' or the like that can apply in a specific section, and control an applying amount of adhesive. Since the upper side of the cooling housing 20 is opened, the applying state may be visually confirmed in the applying process, such that it is possible to easily control the applying amount of the heat transfer member 21 and an applying section to which the heat transfer member 21 is applied. Thereby, since the heat transfer member 21 may be applied only to a required section, the amount of use of the heat transfer member 21 may be minimized.

Meanwhile, when applying the heat transfer member 21, an adhesive such as a bond may be further applied to the cooling housing 20 so as to increase an adhesive strength with the battery group 10, but it is not limited thereto.

As described above, after the heat transfer member 21 is completely applied, the battery group 10 is placed on the cooling plate 20a of the cooling housing 20, and the battery group 10 and the cooling plate 20a closely come into contact with each other. Therefore, the heat transfer member 21 may be adhered in a thinly spread state between the battery group 10 and the cooling plate 20a, and the heat transfer member 21 having a sufficient adhesion force and thermal conductivity may be applied by using a minimum amount of the heat transfer member 21.

Meanwhile, the heat transfer member 21 may be adhered and located in a thinly spread state with a reduced thickness as described above. Preferably, the heat transfer member 21 may be formed in a thickness of 0 to 1 mm or less. Specifically, the heat transfer member 21 may have different thicknesses depending on a tolerance in the size of the battery cells 11 between the manufacturing processes of the battery cells 11, and may be formed to have different thicknesses for each position of the battery cells 11 to be adhered. Furthermore, the heat transfer member 21 may be formed to have a thickness very close to zero (0), and at least a portion of the cooling plate 20a may come into directly contact with the battery cell 11 according to circumstances.

Meanwhile, after the battery group 10 is placed on the cooling plate 20a, the bus bar assemblies 60a and 60b may be connected to the plurality of electrode tabs 12 of the battery group 10. Specifically, each of the plurality of electrode tabs 12 of the battery group 10 may be inserted into and fixed to each of the plurality of slits 61 formed in the bus bar assemblies 60a and 60b, and the electrode tabs 12 and bus bar assemblies 60a and 60b may be electrically connected to each other by laser beam welding. That is, the front electrode tab 12 of the battery group 10 illustrated in FIG. 1 may be inserted into the slit 61 of the front bus bar assembly 60a to be connected thereto, and the rear electrode tab 12 of the battery group 10 may be inserted into the slit 61 of the rear bus bar assembly 60b to be connected thereto.

Figure 18:
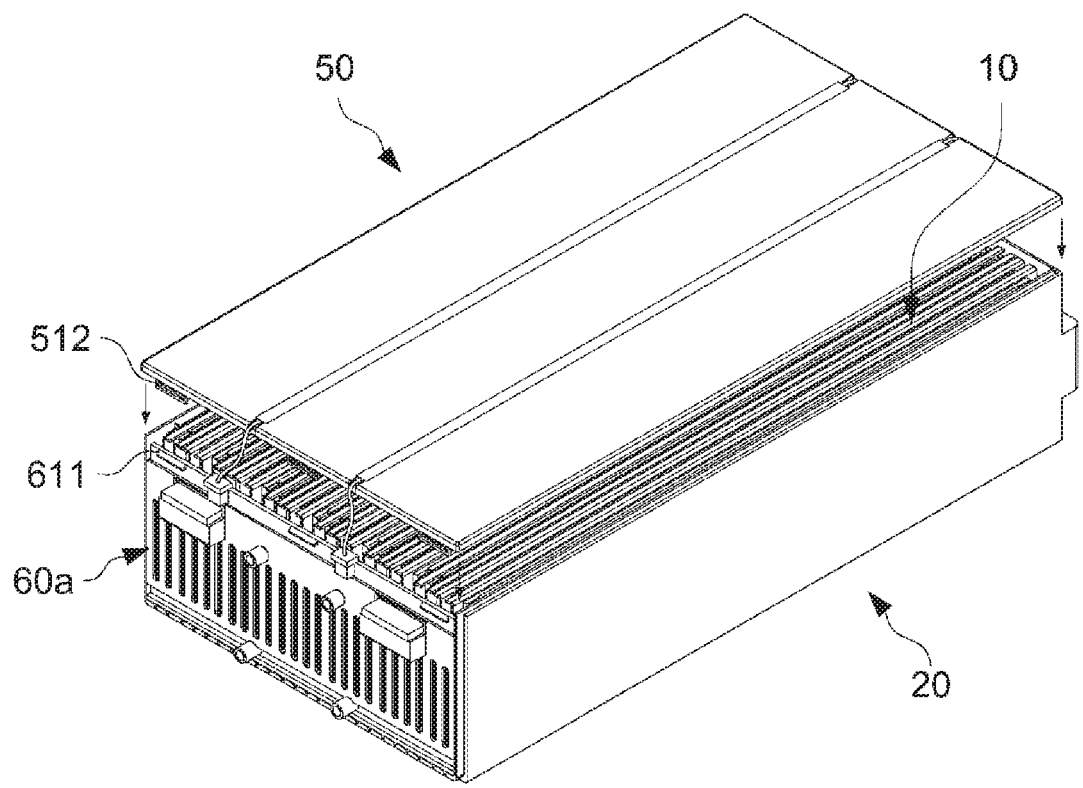
FIG. 18 is a perspective view illustrating a process in which a sensing module assembly is fastened to an upper portion of the battery group to which a bus bar assembly connected, according to another embodiment of the present invention.
Figure 19:
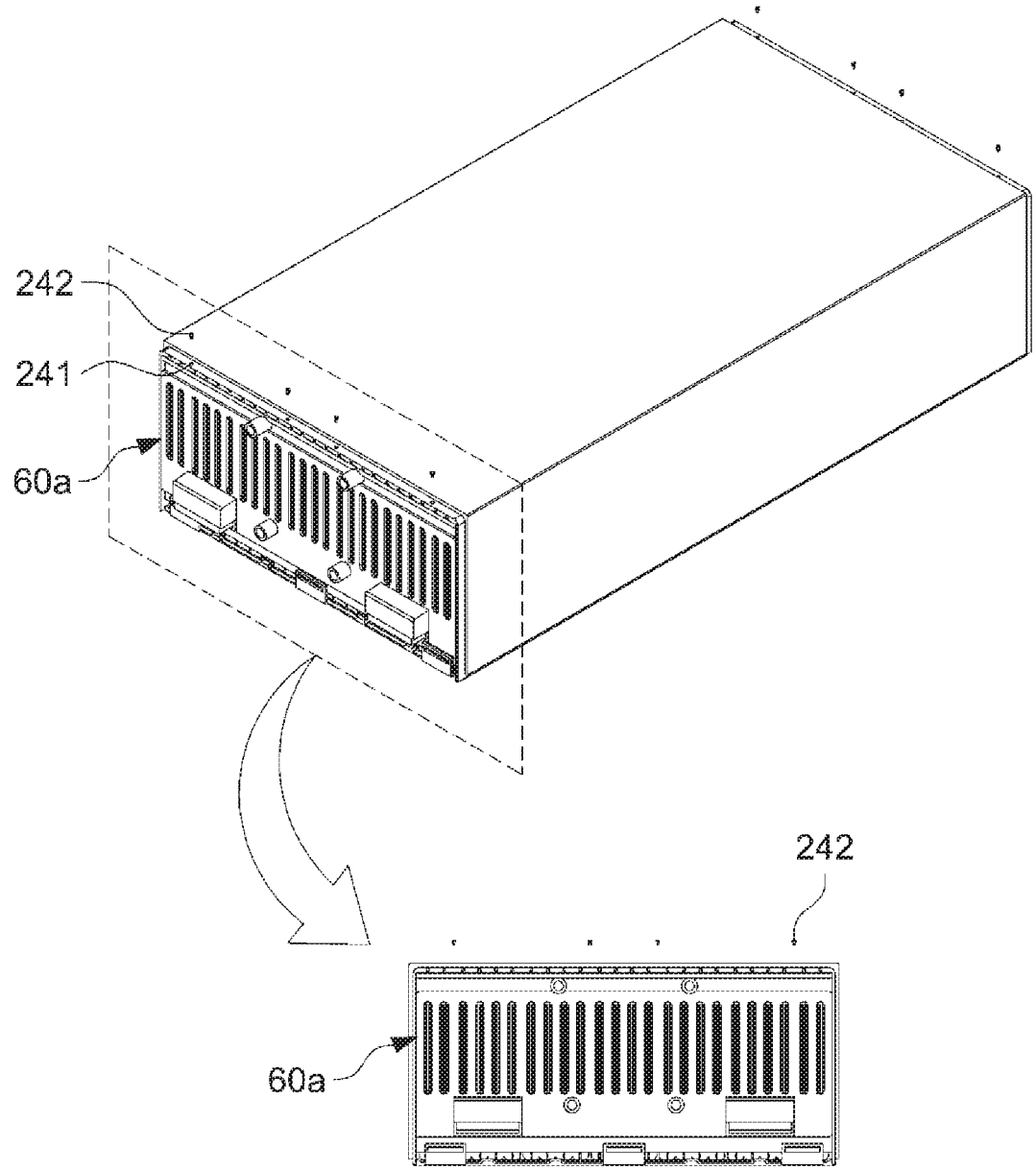
FIG. 19 is a perspective view and a front view illustrating a state in which the bus bar assembly and the cooling housing are fastened, according to another embodiment of the present invention.
Figure 20:
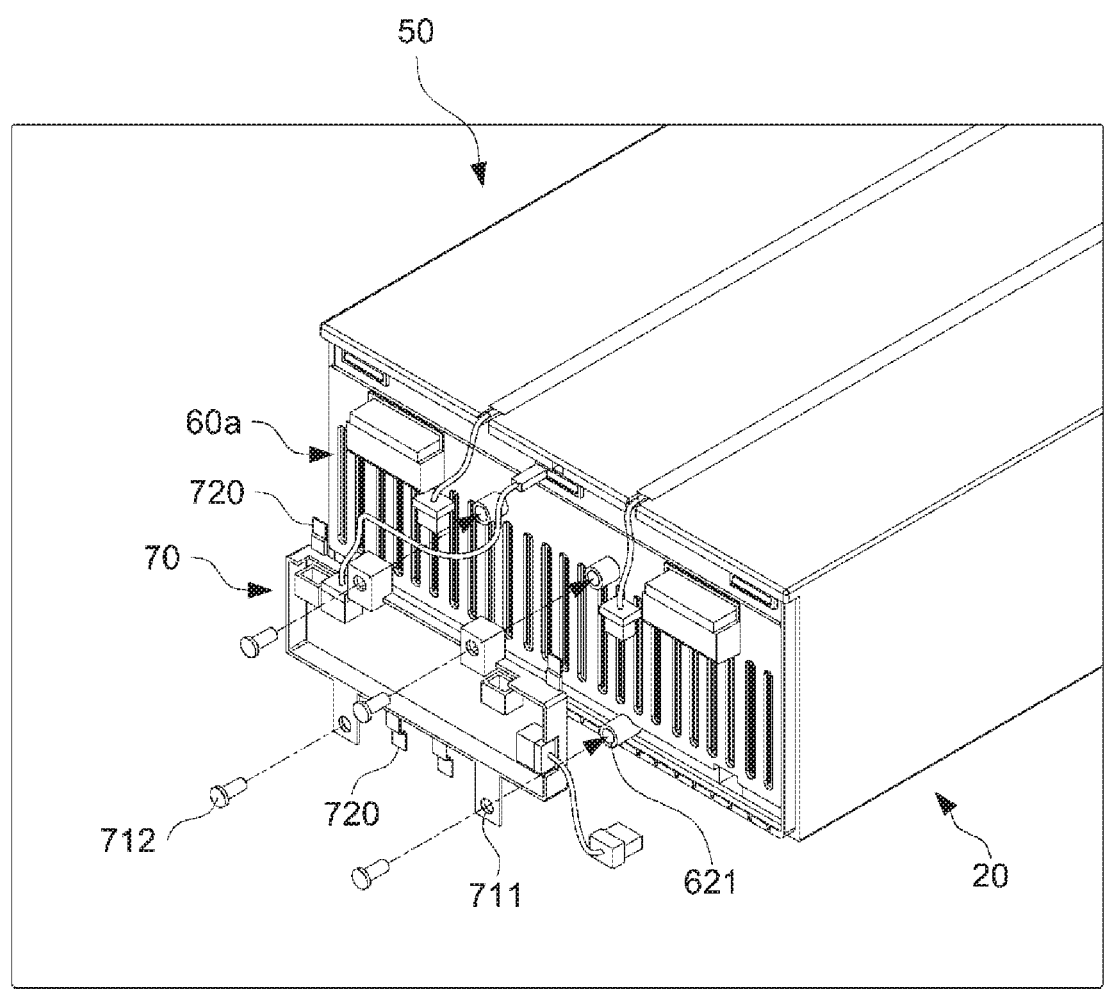
FIG. 20 is a perspective view illustrating a process of fastening the sensing board to the bus bar assembly according to another embodiment of the present invention.

FIG. 18 is a perspective view illustrating a process in which the sensing module assembly 50 is fastened to the upper portion of the battery group 10 to which the bus bar assemblies 60a and 60b are connected, according to another embodiment of the present invention, and FIG. 19 is a perspective view and a front view illustrating a state in which the assemblies 60a and 60b and the cooling housing 20 are fastened, according to another embodiment of the present invention, and FIG. 20 is a perspective view illustrating a process of fastening the sensing board 70 to the bus bar assembly 60a according to another embodiment of the present invention.

Referring to FIGS. 18 to 20, the sensing module assembly 50 may be placed on the upper side of the battery group 10, and then be fastened to the bus bar assemblies 60a and 60b, or to at least a portion of the cooling housing 20. Specifically, the sensing module assembly 50 may have at least one fastening groove 512 formed in at least a portion of the front and rear ends thereof, and the bus bar assemblies 60a and 60b on both sides of the battery group 10 may have at least one fastening part 611 formed on at least a portion of the upper end thereof corresponding to the fastening grooves 512. Thereby, when the sensing module assembly 50 is placed on the upper side of the battery group 10, the fastening parts 611 of the bus bar assemblies 60a and 60b may be hooked and fastened to the fastening grooves 512 of the sensing module assembly 50. At this time, as described above, the sensing module assembly 50 includes the elastic pads 52 to help the battery group 10 be adhered to the lower cooling housing 20. Meanwhile, the forming positions of the fastening grooves 512 and the fastening parts 611 may be reversed.

Further, the method of hooking and fastening the fastening part 611 to the fastening groove 512 is illustrated as an example, but it is not limited thereto, and any method may be used so long as the sensing module assembly 50 can be sufficiently fastened to at least a portion of the bus bar assembly 60a or 60b or the cooling housing 20, thus to be located on the upper side of the battery group 10.

Furthermore, the front and rear bus bar assemblies 60a and 60b may be fixed and tightened to the cooling plate 20a of the cooling housing 20 by a first fastening member 242. Specifically, the cooling plate 20a may have a first fastening hole 241 formed in at least a portion thereof on a side which comes into contact with the front and rear bus bar assemblies 60a and 60b, and the front and rear bus bar assemblies 60a and 60b may have a second fastening hole (not illustrated) corresponding to the first fastening hole 241 formed in at least a portion thereof on a side which comes into contact with the cooling plate 20a. Therefore, the cooling plate 20a and the front and rear bus bar assemblies 60a and 60b may be fixed and tightened to each other by the first fastening members 242 such as a bolt, which are inserted into the first and second fastening holes.

Meanwhile, the sensing board 70 may be connected to the outside of the front bus bar assembly 60a. In this case, the sensing board 70 is connected to the front bus bar assembly 60a for the convenience of description, but it is not limited thereto. As described above, the sensing board 70 may be connected to the rear bus bar assembly 60b, and may measure a voltage of the battery group 10 by the sensing module assembly 50 to confirm the voltage state thereof.

Specifically, the sensing board 70 may have at least one third fastening hole 711 formed therein, and the front bus bar assembly 60a may have at least one fourth fastening hole 621 formed in an outer surface thereof corresponding to the third fastening hole 711. At this time, the third fastening hole 711 and the fourth fastening hole 621 are located correspondingly to each other, and the sensing board 70 and the front bus bar assembly 60a may be fixed and tightened to each other by second fastening members 712 such as a bolt, which are inserted into the third and fourth fastening holes. At this time, at least one sensing contact portion 720 formed on the sensing board 70 may conic into contact with at least a portion of the outer surface of the front bus bar assembly 60a to be electrically connected to each other.

However, the coupling methods by the above-described fastening members 242 and 712, and the coupling holes 241, 621 and 711 are illustrated as an example, but it is not limited thereto, and any method may be used so long as each of the front and rear bus bar assemblies 60a and 60b and the cooling housing 20, as well as, the bus bar assembly 60a or 60b on one side of the battery group 10 and the sensing board 70 can be sufficiently tightened and coupled to be fixed to each other.

Thereafter, the cover plate 40 and the front and rear cover parts 30a and 30b may come into contact with the cooling housing 20 as illustrated in FIG. 8, and then be bonded with each other by welding to prepare the battery module 1. At this time, details of the coupling structure of the cooling housing 20 and the cover plate 40, and the cooling housing 20 and the front and rear cover parts 30a and 30b, respectively, are the same as those described in the above section, and therefore will not be described in detail.

Meanwhile, the battery group 10 of the battery module 1 and the bus bar assemblies 60a and 60b are not exposed to an outside due to the outer cooling housing 20, the front and rear cover parts 30a and 30b, the cover plate 40 and the like. Therefore, the battery module may be protected from external foreign matters, and the fixing and supporting structure of the battery module may be maintained even when an external impact is generated through the above-described fixing structure.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

DESCRIPTION OF SYMBOLS

1: Battery module
10: Battery group
11: Battery cell
12, 12a, 12b: Electrode tab
13: Elastic member
15: Sheath
151: Sealing part
152: Extension part
153: Adhesion part
20, 20x, 20y, 20z: Cooling housing
20a, 20ax, 20ay, 20az: Cooling plate
20ax1, 20ay1, 20az1: First region
20ax2, 20ay2, 20az2: Second region
20b, 20bx, 20by, 20bz: Side plate
21: Heat transfer member
21': Nozzle
22, Protrusion
23: Stepped part
241: First fastening hole
242: First fastening member
25, 25x, 25y: Recess
25z: Accommodating groove
30a, 30b: Cover part
40: Cover plate
31, 41: Vertical part
50: Sensing module assembly
51: Sensing module member
511: Sensing connection member 511a: First connection member
511b: Second connection member
511c: Connection wire
512: Fastening groove
52: Elastic pad
60a, 60b: Bus bar assembly
61: Slit
611: Fastening part
621: Fourth fastening hole
70: Sensing board
711: Third fastening hole
712: Second fastening member
720: sensing contact portion
L: Laser
L1: Extrusion length of extension part

What is claimed is:

1. A battery module comprising:
a battery group including a plurality of battery cells, each of which includes electrode tabs;
a sensing module assembly which is fastened to an upper portion of the battery group, and
a housing extending rearward from a front end of the housing, the housing accommodating the battery group and including:
a cooling plate positioned under the battery group;
side plates extending upward from a first side edge and a second side edge of the cooling plate respectively, each of the side plates including a front stepped part formed depressed from an outer surface thereof at a front end portion thereof and an upper stepped part formed depressed from the outer surface thereof at an upper end portion thereof;
a front cover part including front vertical parts, each of the front vertical parts being coupled to the front stepped part of each of the side plates respectively, each of the front vertical parts covering an outer surface of the front stepped part of each of the side plates respectively; and
a cover plate positioned over the battery group, the cover plate including upper vertical parts, each of the upper vertical parts being coupled to the upper stepped part of each of the side plates respectively, each of the upper vertical parts covering an outer surface of the upper stepped part of each of the side plates respectively,
wherein the plurality of battery cells are arranged from the first side edge towards the second side edge, and
wherein the sensing module assembly includes:
a sensing module member positioned below the cover plate, the sensing module member having a sensing plate having a shape of a plate and a plurality of protruding grooves protruding towards the cooling plate from the sensing plate, each of the plurality of protruding grooves extending alongside a boundary between two adjacent battery cells of the plurality of battery cells; and
an elastic pad positioned below the sensing module member, the elastic pad pressing the battery group toward the cooling plate.

2. The battery module according to claim 1, further comprising a heat transfer member,
wherein the heat transfer member is located in a thin film form between the cooling plate and the battery group.

3. The battery module according to claim 2, the heat transfer member fills an empty space between the cooling plate and the plurality of battery cells.

4. The battery module according to claim 2,
wherein each of the plurality of battery cells includes:
a sealing part and a non-sealing part formed on a pouch housing an electrode assembly,
wherein the sealing part is formed on three sides among four sides of circumferences of the battery cell, and the non-sealing part is formed on the other side of the battery cell, and
wherein the non-sealing parts of the plurality of battery cells are disposed on the cooling plate and configured to transfer heat to the cooling plate,
wherein the cooling plate closely comes into contact with the non-sealing part of the plurality of battery cells through the heat transfer member.

5. The battery module according to claim 4, wherein the cooling plate has a plurality of protrusions formed thereon, and
each of the protrusions is disposed across the non-sealing parts of adjacent battery cells.

6. The battery module according to claim 5, wherein each of the protrusions has a curved surface corresponding to a shape of a portion of the non-sealing part.

7. The battery module according to claim 4, wherein a portion of the sealing part adjacent to the non-sealing part has an extension part extending in a direction perpendicular to the non-sealing part.

8. The battery module according to claim 7, wherein the cooling plate has a plurality of recesses formed therein to receive the extension part.

9. The battery module according to claim 8, wherein the plurality of recesses are formed in the cooling plate at positions corresponding to the extension parts.

10. The battery module according to claim 7, wherein the cooling plate has a plurality of accommodating grooves formed therein to receive the extension parts of one or more battery cells adjacent to each other of the plurality of battery cells, respectively.

11. The battery module according to claim 1, wherein the cooling plate and the side plates are formed as a single piece, and wherein the cooling plate dissipates heat generated in the battery group.

12. The battery module according to claim 1,
further comprising: bus bar assemblies which are connected to the electrode tabs to electrically connect the plurality of battery cells to each other.

13. The battery module according to claim 12, further comprising: a sensing board located at one side of the bus bar assemblies to detect a voltage of the plurality of battery cells,
wherein the sensing module assembly electrically connects a remaining one of the bus bar assemblies to the sensing board.

14. The battery module according to claim 12, wherein the bus bar assemblies include a front bus bar assembly positioned between the front cover part and at least a portion of the battery group.

15. The battery module according to claim 1, wherein the battery group includes elastic members disposed between at least two bundles of the plurality of battery cells.

16. The battery module according to claim 1, wherein the front vertical parts face the front stepped parts, and wherein the upper vertical parts face the upper stepped parts.

17. The battery module according to claim 16, wherein the front stepped parts and the front vertical parts are bonded by irradiating a laser beam on a verge of each of the front vertical parts, and wherein the upper stepped parts and the upper vertical parts are bonded by irradiating the laser beam on a verge of each of the upper vertical parts.

* * * * *